United States Patent
Ogle et al.

(10) Patent No.: US 8,708,045 B2
(45) Date of Patent: Apr. 29, 2014

(54) MULTIFUNCTIONAL BORONIC ACID CROSSLINKING AGENTS AND ASSOCIATED METHODS

(75) Inventors: James William Ogle, Duncan, OK (US);
Jeremy Holtsclaw, Lawton, OK (US);
Rajesh Kumar Saini, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 351 days.

(21) Appl. No.: 13/229,941

(22) Filed: Sep. 12, 2011

(65) Prior Publication Data

US 2012/0004148 A1 Jan. 5, 2012

Related U.S. Application Data

(63) Continuation-in-part of application No. 12/827,224, filed on Jun. 30, 2010, now Pat. No. 8,424,603.

(51) Int. Cl.
| | | |
|---|---|---|
| *E21B 43/26* | (2006.01) | |
| *E21B 43/267* | (2006.01) | |
| *C09K 8/60* | (2006.01) | |
| *C09K 8/68* | (2006.01) | |

(52) U.S. Cl.
USPC .............. 166/300; 166/305.1; 166/308.3; 166/308.5; 507/211; 507/215; 507/216; 507/217; 507/224; 507/225; 507/226; 507/273; 507/903; 507/904

(58) Field of Classification Search
None
See application file for complete search history.

(56) References Cited

U.S. PATENT DOCUMENTS

| | | | |
|---|---|---|---|
| 5,373,901 | A | 12/1994 | Norman et al. |
| 5,445,223 | A | 8/1995 | Nelson et al. |
| 5,559,082 | A | 9/1996 | Sanner et al. |
| 6,444,316 | B1 | 9/2002 | Reddy et al. |
| 6,488,091 | B1 | 12/2002 | Weaver et al. |
| 6,527,051 | B1 | 3/2003 | Reddy et al. |
| 6,554,071 | B1 | 4/2003 | Crook et al. |
| 7,082,995 | B2 | 8/2006 | Hanes, Jr. et al. |
| 7,405,183 | B2 | 7/2008 | Hanes, Jr. |
| 8,173,580 | B2 | 5/2012 | De Benedictis et al. |
| 8,424,603 | B2 | 4/2013 | Loveless et al. |
| 2005/0203256 | A1 | 9/2005 | Destarac et al. |
| 2006/0003900 | A1 | 1/2006 | Hanes, Jr. |
| 2006/0205605 | A1 | 9/2006 | Dessinges et al. |
| 2009/0181865 | A1 | 7/2009 | Dessinges et al. |
| 2010/0099586 | A1 | 4/2010 | De Benedictis et al. |
| 2010/0179076 | A1 | 7/2010 | Sullivan et al. |
| 2012/0000659 | A1 | 1/2012 | Loveless et al. |

FOREIGN PATENT DOCUMENTS

| | | |
|---|---|---|
| FR | 2855180 A1 | 11/2004 |
| WO | WO 2010/048091 A2 | 4/2010 |
| WO | 2012001363 A1 | 1/2012 |

OTHER PUBLICATIONS

International Search Report and Written Opinion for PCT/GB2011/000990 dated Oct. 7, 2011.
Kitano, Shigeru, "Glucose-Responsive Complex Formation Between Poly(Vinyl Alcohol) and Poly(N-vinyl-2-pyrrolidone) with Pendent Phenylboronic Acid Moieties," Makromol. Chem., Rapid Commun. 12, 227-233 (1991).
Roberts et al., "Dynamically Restructuring Hydrogel Networks Formed with Reversible Covalent Crosslinks," Adv. Mater. 2007, 2503-2507.
Coveney et al., "Novel Approaches to Cross-Linking High Molecular Weight Polysaccharides: Application to Guar-Based Hydraulic Fracturing Fluids," Molecular Simulation, 2000, vol. 25, pp. 265-299.
Bishop et al., "Determination of the Mode and Efficacy of the Cross-Linking of Guar by Borate Using MAS 11B NMR of Borate Cross-Linked Guar in Combination with Solution 11B NMR of Model Systems," The Royal Society of Chemistry, 2004.
Ivanov, et al., "Synthesis of Boronate-Containing Copolymers of N,N-dimethylacrylamide, their interaction with poly (vinyl alcohol) and rheological behaviour of the gels," Polymer, Elsevier Science Publishers B.V., GB, vol. 45, No. 8, Apr. 1, 2004, XP004497161.
International Search Report and Written Opinion for PCT/US2012/050231 dated Nov. 5, 2012.

*Primary Examiner* — George Suchfield
(74) *Attorney, Agent, or Firm* — McDermott Will & Emery LLP; Craig W. Roddy

(57) ABSTRACT

Treatment of a subterranean formation can be conducted with viscosified treatment fluids that comprise a multifunctional boronic acid crosslinking agent. Methods for treating a subterranean formation can comprise providing a treatment fluid that comprises an aqueous base fluid, a gelling agent, and a multifunctional boronic acid crosslinking agent that comprises a copolymer comprising at least one boronic acid monomer unit and at least one water-soluble monomer unit; and introducing the treatment fluid into a subterranean formation.

22 Claims, 8 Drawing Sheets

MULTIFUNCTIONAL BORONIC ACID CROSSLINKING AGENTS AND ASSOCIATED METHODS

CROSS-REFERENCE TO RELATED APPLICATIONS

This application is a continuation-in-part of U.S. patent application Ser. No. 12/827,224, filed Jun. 30, 2010, which is incorporated herein by reference in its entirety.

BACKGROUND

The present invention relates to methods and compositions for increasing the viscosity of a treatment fluid, and, more specifically, to methods and compositions for treating a subterranean formation using a viscosified treatment fluid that contains a multifunctional boronic acid crosslinking agent.

Many industrial applications, including those in the upstream energy industry, utilize viscosified fluids or "viscosified treatment fluids." As used herein, the terms "treatment" or "treating" refer to any subterranean operation that uses a fluid in conjunction with achieving a desired function and/or for a desired purpose. The terms "treatment" and "treating," as used herein, do not imply any particular action by the fluid or any particular component thereof. Treatment fluids can include, for example, drilling fluids, fracturing fluids, gravel packing fluids, acidizing fluids, conformance treatment fluids, damage control fluids, remediation fluids, scale removal and inhibition fluids, chemical floods, and the like. Generally, viscosified treatment fluids that are used in subterranean operations are aqueous-based fluids that comprise gelling agents. These gelling agents can be biopolymers or synthetic polymers. Common gelling agents that can be used in viscosified treatment fluids can include, for example, galactomannan gums, cellulosic polymers, and polysaccharides.

Most viscosified treatment fluids crosslink the gelling agent using a crosslinking agent to increase the fluid's viscosity. Common crosslinking agents can comprise a metal ion, a transition metal, or a metalloid, which are collectively referred to herein as "metal(s)." Illustrative metals suitable for crosslinking can include, for example, aluminum, antimony, zirconium, magnesium and titanium. Generally, the metal of a crosslinking agent can interact with at least two gelling agent molecules to form a crosslink between them, thereby forming a crosslinked gelling agent.

Although conventional metal crosslinking agents can frequently be used in viscosified treatment fluids, the use of such crosslinking agents can be problematic because they may not form a viscoelastic gel below a critical concentration of gelling agent (e.g., the critical overlap concentration C*). In addition, such viscosified treatment fluids may not be thermally stable at high temperatures (e.g., temperatures exceeding about 300° F.), such that a loss of viscosity occurs over time. To offset these types of viscosity losses, the concentration of the gelling agent and/or the crosslinking agent can be increased, albeit at an increased cost of goods. Further, higher concentrations of the gelling agent and/or the crosslinking agent can make the viscosified treatment fluid more difficult to remove from a subterranean formation.

Various crosslinking agents have been investigated that are not based upon metals. For example, acrylamide-containing polymers, copolymers, and partially hydrolyzed variants thereof can be gelled with polyalkyleneimine and polyalkylenepolyamine crosslinking agents. In addition, boron-containing compounds such as, for example, boric acid and ulexite mineral (hydrated sodium calcium borate hydroxide) have been investigated as crosslinking agents with guar and other polysaccharide gelling agents. Boronic acid crosslinking agents, particularly boronic acid-containing polymers, have also been investigated in this regard. Boronic acid crosslinking agents can present particular advantages such as, for example, being able to crosslink a fluid at or near a neutral pH. At high pH values (e.g., >11), certain ions such as, for example, calcium and magnesium ions can precipitate and potentially damage a subterranean formation.

Although boronic acid-containing polymers can be at least comparable to metal crosslinking agents in many regards, boronic acid copolymers synthesized by conventional synthetic techniques can result in inefficient use of the boronic acid monomer units therein. Specifically, conventional techniques for synthesizing boronic acid copolymers can form gradient copolymers in which the boronic acid monomer units are clustered in less than the whole length of the polymer chain. Without being bound by theory or mechanism, the formation of gradient copolymers can result from different reaction rates of the monomers being used to form the copolymer. As a result of gradient copolymer formation, only a portion of the polymer chain can be available for crosslinking, which results in a sub-optimal use of material goods. Gradient copolymer formation can sometimes be addressed by using an excess of one or more monomers to drive the polymerization reaction kinetics toward a non-gradient copolymer product, but this approach again results in a sub-optimal use of material goods.

Accordingly, if boronic acid copolymers could be synthesized such that gradient copolymer formation is eliminated, minimized or reduced relative to conventional synthetic techniques, lower concentrations of these crosslinking agents could be utilized in a treatment fluid to obtain comparable crosslinking effects. In addition, such boronic acid copolymers might also allow lower concentrations of the gelling agent to be used in a treatment fluid, while still efficiently forming a gel.

SUMMARY

The present invention relates to methods and compositions for increasing the viscosity of a treatment fluid, and, more specifically, to methods and compositions for treating a subterranean formation using a viscosified treatment fluid that contains a multifunctional boronic acid crosslinking agent.

In one embodiment, the present invention provides a method comprising: providing a treatment fluid that comprises: an aqueous base fluid; a gelling agent; and a multifunctional boronic acid crosslinking agent comprising a copolymer that comprises at least one boronic acid monomer unit and at least one water-soluble monomer unit; and introducing the treatment fluid into a subterranean formation.

In one embodiment, the present invention provides a method comprising: providing a treatment fluid that comprises: an aqueous base fluid; a gelling agent; and a multifunctional boronic acid crosslinking agent comprising a copolymer that comprises at least one boronic acid monomer unit and at least one water-soluble monomer unit; wherein the multifunctional boronic acid crosslinking agent does not comprise a gradient copolymer; and introducing the treatment fluid into a subterranean formation at a pressure sufficient to create or enhance at least one fracture therein.

In one embodiment, the present invention provides a treatment fluid comprising: an aqueous base fluid; a gelling agent; and a multifunctional boronic acid crosslinking agent comprising a copolymer that comprises at least one boronic acid monomer unit and at least one water-soluble monomer unit.

The features and advantages of the present invention will be readily apparent to one of ordinary skill in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will be evident to one having ordinary skill in the art and the benefit of this disclosure.

DETAILED DESCRIPTION

Figure 1:
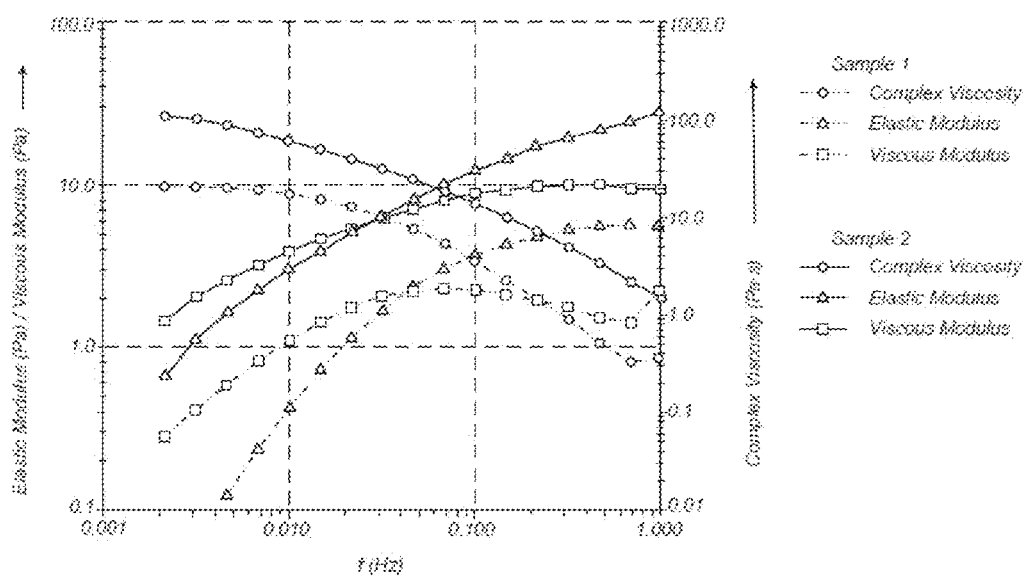
FIG. 1 illustrates the experimental results of a frequency sweep analysis of an embodiment of a viscosified fluid comprising a multifunctional boronic acid crosslinking agent.

The present invention relates to methods and compositions for increasing the viscosity of a treatment fluid, and, more specifically, to methods and compositions for treating a subterranean formation using a viscosified treatment fluid that contains a multifunctional boronic acid crosslinking agent.

The methods and compositions of the present invention are useful in a variety of applications in which it is desirable to increase the viscosity of a fluid. Examples include, but are not limited to, treatment fluids used in subterranean operations (e.g., drilling fluids, fracturing fluids, gravel packing fluids and viscous sweeps). Although many of the embodiments of the present invention will be discussed in the context of subterranean operations, such discussion is only intended to illustrate some applications of the multifunctional boronic acid crosslinking agents of the present invention and should not be considered limiting.

Embodiments of the present invention generally relate to treatment fluids comprising a multifunctional boronic acid crosslinking agent. There are a number of advantages to the methods and compositions of the present invention, only some of which are described herein. Treatment fluids comprising a multifunctional boronic acid crosslinking agent can exhibit improved gelling characteristics despite lower concentrations of the multifunctional boronic acid crosslinking agent being used relative to a conventional boron-containing crosslinking agent. In some embodiments, the multifunctional boronic acid crosslinking agents can be capable of crosslinking the fluid at or close to a neutral pH. In some embodiments, a viscosified treatment fluid can be broken by lowering the pH of the fluid into the acidic range less than about 6) and then re-viscosified by increasing the pH back to at least slightly basic (e.g., above about 7.5). By way of example, depending on the amount of gelling agent in various embodiments, the amount of crosslinking agent, and the presence of other crosslinking agents in addition to the multifunctional boronic acid crosslinking agent, the fluid can crosslink at a pH of above about 7.5, above about 8, above about 8.5, above about 9, above about 9.5, above about 10, or above about 10.5. As another advantage, in some embodiments, the multifunctional boronic acid crosslinking agent can be used to form a viscosified treatment fluid below the critical overlap concentration (C*) of the gelling agent in the treatment fluid. Additionally, the multifunctional boronic acid crosslinking agents of the present invention can form gels that are thermally stable at temperatures above about 200° F., and in certain embodiments, the multifunctional boronic acid crosslinking agents can be suitable for use at temperatures ranging between about 75° F. to about 275° F.

In addition to the foregoing advantages, various embodiments described herein can be practiced with boronic acid copolymers that are different than those synthesized by conventional techniques. Such boronic acid copolymers can have more favorable properties than those synthesized by conventional synthetic methods, as outlined below. As previously noted, boronic acid copolymers synthesized by conventional methods can result in inefficient use of the monomer units therein, particularly when the reaction rates of the boronic acid monomer units and other monomer units are significantly different from one another. Specifically, conventional methods for synthesizing boronic acid copolymers can form gradient copolymers in which the boronic acid monomer units are clustered in less than the whole length of the polymer chain. As used herein, the term "gradient copolymer" will refer to a copolymer in which there is a block or random distribution of at least two monomer units in a copolymer, wherein at least one of the monomer units is not substantially distributed over the whole length of the polymer chain. Gradient copolymers can also be referred to as "blocky copolymers," since at least one of their monomer units is clustered in a block within the polymer chain, sometimes in combination with other monomer units, while other blocks within the polymer chain are substantially free of the monomer unit. It should be understood that within the block containing the monomer unit of interest, its distribution can be random or ordered. That is, the term "gradient copolymer" does not imply any particular degree of order in the monomer units.

Without being bound by theory or mechanism, it is believed that boronic acid copolymers prepared by most conventional synthetic methods, particularly free radical polymerization of vinyl boronic acid monomer units, can have at least some gradient copolymer character due to differing reaction rates of their monomer units, as demonstrated herein by the present inventors. As used herein, the term "vinyl boronic acid monomer units" will refer to any boronic acid having an alkene-type unsaturation (e.g., vinyl boronic acids, allyl boronic acids, acrylic-type boronic acids, combinations thereof, substituted variants thereof and the like). Vinyl boronic acid monomer units can often react faster than other monomer units, particularly at higher pH values, such that the boronic acid monomer units can predominate on the interior of the polymer chain (i.e., in a block), and the polymer chain termini can be predominantly comprised of the less reactive monomer units. As a result of gradient copolymer formation, less than the whole polymer chain length can be effective for crosslinking (i.e., only that portion having boronic acid monomer units). Although incorporation of non-crosslinkable monomer units can be desirable in a multifunctional boronic acid crosslinking agent (e.g., to serve as spacer units between boronic acid monomer units), it can be undesirable for a majority of these non-crosslinkable monomer units to be clustered within only certain regions of the polymer chain, where they are effectively dead weight. In this case, the undesirable placement of monomer units again results in a suboptimal use of material goods.

In addition, gradient copolymers can display a decreased syneresis relative to like copolymers containing a more random distribution of monomer units. As used herein, the term "syneresis" refers to the process by which a gel contracts upon standing to exude water. Gels having a decreased syneresis can have a reduced elasticity relative to a copolymer having a more random monomer distribution.

If boronic acid copolymers could be prepared such that gradient copolymer formation is eliminated, minimized or reduced relative to conventional synthetic techniques, lower concentrations of these crosslinking agents could be used in a treatment fluid for a given polymer molecular weight to obtain comparable crosslinking effects. That is, for a copolymer having a like number of boronic acid monomer units, a copolymer having a lower molecular weight could produce a similar gelling effect to a higher molecular weight polymer having more non-crosslinkable monomer units. The opportunity to use lower concentrations of the crosslinking agents in a treatment fluid can advantageously lead to lessened environmental effects.

In addition to the opportunity to use lower concentrations of crosslinking agent, it is also believed that boronic acid copolymers can also allow lower concentrations of gelling agent to be used in a treatment fluid to achieve efficient gelling. The opportunity to use lower concentrations of the gelling agent can also provide lessened environmental effects. For example, in some embodiments, a gelling agent present below its critical overlap concentration C* can be effectively crosslinked using a boronic acid copolymer.

The opportunity to use lesser concentrations of gelling agent can also be advantageous in terms of material costs. In particular, in some embodiments, boronic acid copolymers can be especially effective when crosslinked with guar and other polysaccharides a treatment fluid. As the cost of guar has significantly increased in recent years, it would be advantageous to use reduced quantities of this gelling agent in order to achieve suitable crosslinking results at a tower material cost. In this regard, it is expected that there will continue to be supply shortages of this biopolymer due to ongoing weather-related reductions in biomass growth. Further, the use of lower quantities of gelling agent can result in more facile formation cleanup and better regained conductivity.

In various embodiments, the treatment fluids of the present invention can comprise an aqueous base fluid, a multifunctional boronic acid crosslinking agent, and a gelling agent.

The aqueous base fluid of the treatment fluids can comprise fresh water, saltwater (e.g., water containing one or more salts dissolved therein), brine (e.g., saturated salt water), seawater, a weighted brine (e.g., calcium bromide or sodium bromide), or any combination thereof. The aqueous base fluid can be from any source. In general, the aqueous base fluid should not contain an excess of compounds that can adversely affect the desired properties of the treatment fluid.

In various embodiments, the treatment fluids of the present invention can be used in a number of subterranean operations, which have been set forth hereinabove. In some embodiments, the treatment fluids can be introduced into at least a portion of a subterranean formation. In some embodiments, the treatment fluids can be introduced into at least a portion of a subterranean formation and used to create or enhance at least one fracture therein.

The present invention provides multifunctional boronic acid crosslinking agents capable of crosslinking two or more molecules (e.g., two or more gelling agent molecules). As used herein, the terms "crosslink(s)" or "crosslinking" refer to a connecting unit between neighboring chains of atoms in a complex chemical molecule (e.g., a polymer or biopolymer). Such multifunctional boronic acid crosslinking agents can offer more efficient crosslinking compared to borate minerals and can more effective crosslink at lower concentrations in some embodiments. In some embodiments, the multifunctional boronic acid crosslinking agents of the present invention can comprise a polymeric backbone with a boronic acid functional group attached at one or more points along the polymer chain. In some embodiments, the multifunctional boronic acid cross agents can comprise a copolymer that comprises at least one boronic acid monomer unit and at least one water-soluble monomer unit. In some embodiments, the multifunctional boronic acid crosslinking agents can comprise a random copolymer of at least one boronic acid monomer unit and at least one water-soluble monomer unit, particularly a random copolymer in which the boronic acid monomer units are distributed over substantially all of the polymer chain length. In alternative embodiments, the multifunctional boronic acid crosslinking agents can comprise a copolymer that is a gradient copolymer. In other embodiments, the multifunctional boronic acid crosslinking agents can comprise a copolymer that is not a gradient copolymer. In some embodiments, the multifunctional boronic acid crosslinking agents of the present invention can comprise a copolymer that has less gradient copolymer character than a similar copolymer produced by conventional synthetic techniques.

In general any boronic acid or boronate ester derived therefrom can be suitable for use in the multifunctional boronic acid crosslinking agents of the present invention. That is, the multifunctional boronic acid crosslinking agents of the present invention can contain a boronic acid group (e.g., $B(OH)_2$) or a boronate ester derived therefrom. In some embodiments, the boronic acids can be aryl boronic acids, particularly vinyl aryl boronic acids. An illustrative aryl boronic acid that can be suitable for practicing the present invention can be 4-vinylphenylboronic acid or its positional isomers, for example. Other substituted aryl boronic acids containing a polymerizable functional group (e.g., alkene) and optional functionality on the aryl ring (e.g., alkyl groups, halogens, carbonyl groups, amines, hydroxyl groups, carboxylic acids and their derivatives, and the like) can also be used, if desired. In other embodiments, the boronic acids containing a polymerizable functional group can be alkyl, alkenyl, or alkynyl boronic acids (i.e., aliphatic boronic acids) in which the alkyl, alkenyl, or alkynyl groups can contain optional substitution, if desired.

In some embodiments, the multifunctional boronic acid crosslinking agents can be di-, tri- or multifunctional in nature. In some embodiments, the multifunctional boronic acid crosslinking agents can be star shaped or dendrimeric in nature. The multifunctional boronic acid crosslinking agents can also be polymeric in nature. In some embodiments, a polymeric multifunctional boronic acid crosslinking agent can be a block copolymer including, but not limited to, a diblock, triblock or multiblock copolymer. A polymeric multifunctional boronic acid crosslinking agent can also be a copolymer of various monomers and can also be in the form of comb or brush shaped polymer. In some embodiments, the multifunctional boronic acid crosslinking agents of the present invention can be water-soluble. As used herein, "water-soluble" refers to at least about 0.01% by weight soluble in water at room temperature (about 72° F.).

In some embodiments, the multifunctional boronic acid crosslinking agents can be star shaped or dendrimeric in nature. An exemplary structure of a dendrimeric multifunctional boronic acid crosslinking agent is shown in Formula I, where R is an organic group.

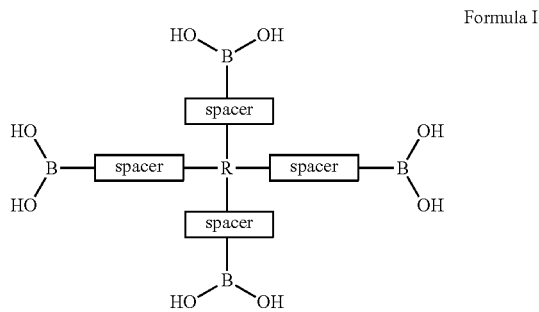

Formula I

As used herein, the terms "dendritic polymers" or "dendrimers" refer to polymers which are distinguished by a branched structure. Dendrimers (e.g., cascade polymers, arborols, isotropically branched polymers, isobranched polymers, starburst polymers) generally are macromolecules which are uniform at the molecular level and have a highly symmetrical structure. Dendrimers are derived structurally from the star polymers, the individual chains in turn each being branched in a star-like manner. They can form from small molecules by a constantly repeating reaction sequence, resulting in one or more branches, on the ends of which there are in each case functional groups which in turn are starting points for further branching. Thus, the number of functional terminal groups multiplies with each reaction step. A characteristic feature of the dendrimers is the number of reaction steps (generations) carried out for their synthesis. Owing to their uniform structure, dendrimers can have as a rule a defined molar mass. In some embodiments, the multifunctional boronic acid crosslinking agents of the present invention can be dendrimeric in nature with about 2 to about 10 generations. In another embodiment, the dendrimeric multifunctional boronic acid crosslinking agents can have about 2 to about 5 generations. In some embodiments, the dendrimeric multifunctional boronic acid crosslinking agents can generally have a molecular weight between about 1,000 Daltons and 10,000 Daltons.

Star polymers refer to polymers in which three or more chains extend from a center moiety. The center moiety can be a single atom or a group of atoms. Star polymers can be produced either by polymerization from multifunctional cores or by post modification reactions. Polymerization from a multifunctional core can be desirable for high molecular weight polymers. Star polymer synthesis by post modification reactions is well known, and is described, for example, in B. Charleus and J. Nicolas, POLYMER 48: 5813 (2007); and in S. Abraham et al., *J Poly Sci A: Poly Chem* 45:5559 (2007).

The dendritic or star polymeric multifunctional boronic acid crosslinking agents can comprise any suitable monomer units and/or spacer units (e.g., "R" or "spacer" in Formula I) that result in a water-soluble molecule in addition to one or more boronic acid functional groups. In some embodiments, the monomer units can be water-soluble. For example, Formula I illustrates a dendritic multifunctional boronic acid crosslinking agent with at least one generation that may have up to four boronic acid functional groups. In some embodiments with at least 2 generations, the dendritic multifunctional boronic acid crosslinking agents can have up to eight boronic acid functional groups in the outer generation. In addition to the boronic acid functional group, spacer units can comprise a polymer or oligomer synthesized from at least one water-soluble monomer unit that includes, but is not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides, alkyl dimethylammoniumethyl methacrylate halides, alkyl dimethylammoniumpropyl methacrylamide halides, any derivative thereof, or any combination thereof. Suitable spacer units can also comprise any suitable linkage moieties, including but not limited to, an amide, ester, ether, phosphate esters, amides, acetals, ketals, orthoesters, carbonates, anhydrides, silyl ethers, alkene oxides, ethers, imines, ether esters, ester amides, ester urethanes, carbonate urethanes, and amino acids linkage and derivatives or any combination thereof. Suitable spacer units may also comprise any suitable linkage moieties, including but not limited, to an alkane, a polyethylene amine, a polyethylene oxide, a polyester, polycarbonate, polyurethane, polyphosphate esters, polyamides, polyacetals, polyketals, polyorthoesters, polyanhydrides, polysilyl ethers, polyalkene oxides), polyethers, polyimines, poly (ether esters), poly(ester amides), poly(ester urethanes), poly (carbonate urethanes), and poly(amino acids), and any derivative thereof or any combination thereof. In addition to these water-soluble monomer units and/or spacer units, one or more hydrophobic and/or hydrophilic monomer units or polymers comprising hydrophobic monomers can also be present in the interior generations of the dendrimer so long as any hydrophobic monomer units do not interfere with the water solubility of the molecule. In some embodiments, the multifunctional boronic acid crosslinking agents can have a ratio of boronic acid functional groups to monomers on the outer generation ranging from about 1:1 to about 1:200.

In some embodiments, the multifunctional boronic acid crosslinking agents can be a difunctionalized molecule. A suitable difunctionalized molecule structure can include, but is not limited to, the structure generally represented by Formula II, where $R_1$ is an organic group.

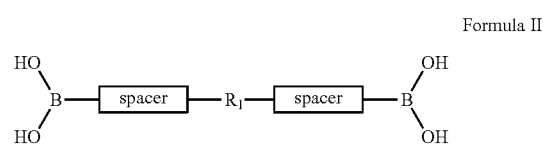

Formula II

In Formula II, $R_1$ and/or the spacer(s), alone or in combination, can be a functional group, a monomer, and/or a polymer with an average molecular weight in the range of about 200 Daltons to about 2,000,000 Daltons. The spacer(s) can be a small oligomer, a functional group, or a polymer suitable for connecting the monomer or polymer $R_1$ to the boronic acid functional group. Suitable spacer units can comprise any suitable moieties, including but not limited to, an amide group, an ester group, or an ether group. Suitable polymers useful as spacer units can comprise polyalphaolefins, polyaryletherketones, polybutenes, polyimines, polycarbonates, polyesters, aromatic polyamides, ethylene vinyl acetate polymers, polyacetals, polyethylenes, polyethylene oxides, polypropylenes, polymethylpentene, polyphenylene oxide, polystyrene, any derivative thereof, or any combination thereof. In some embodiments, the multifunctional boronic acid crosslinking agents of the general structure shown in Formula II can be a water-soluble polymer and can comprise any number of suitable monomer units that do not interfere with the crosslinking of the boronic acid groups with the gelling agent.

The multifunctional boronic acid crosslinking agents can also be a copolymer. Suitable copolymer structures can include, but are not limited to, the structure generally represented by Formula III, where X represents a functionality bound to a monomer unit of the polymer backbone. Although Formula III has indicated a regular spacing between boronic acid monomer units, it is to be recognized that the spacing of boronic acid monomer units can be regular in some embodiments or random in other embodiments.

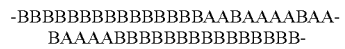

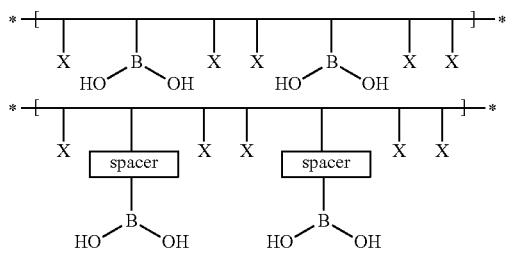

In some embodiments, the multifunctional boronic acid crosslinking agent can comprise a copolymer that comprises at least one boronic acid monomer unit and at least one water-soluble monomer unit. In some embodiments, the multifunctional boronic acid crosslinking agent can comprise a random copolymer of at least one boronic acid monomer unit and at least one water-soluble monomer unit. In some embodiments, the multifunctional boronic acid crosslinking agent can comprise a copolymer that is a gradient copolymer. Formula IV shows a structure of an illustrative but non-limiting gradient copolymer containing monomer units A and B. According to the present embodiments, a multifunctional boronic acid crosslinking agent synthesized according to conventional techniques would have a structure related to that of Formula IV, where A represents a monomer unit comprising a boronic acid functionality. As previously noted, the formation of a gradient copolymer such as that shown in Formula IV can result from a faster reaction rate of one monomer compared to the other. In the case of Formula IV, monomer unit A (the boronic acid) has a much faster reaction rate than monomer B, such that the interior portion of the polymer chain is dominated by monomer A and the termini of the polymer chain is dominated by monomer B.

-BBBBBBBBBBBBBBBBAABAAAABAA-
BAAAABBBBBBBBBBBBBBB-      Formula IV

In some embodiments, the multifunctional boronic acid crosslinking agent can comprise a copolymer that is not a gradient copolymer. An illustrative but non-limiting non-gradient copolymer can have a structure shown in Formula V below, where A presents a monomer unit comprising a boronic acid functionality. In some embodiments, the multifunctional boronic acid crosslinking agent can comprise a copolymer that has less gradient copolymer character than a comparable copolymer produced by conventional synthetic techniques. For example, a multifunctional boronic acid crosslinking agent having less gradient copolymer character might have only about 5 B monomer units on its chain termini, as compared to 15 B monomer units in Formula IV. Illustrative techniques for synthesizing multifunctional boronic acid crosslinking agents that are non-gradient or less gradient in character than those conventionally synthesized are set forth in more detail hereinafter.

-BABBBBAABBBBBBBABBBABAABABBB-
BABBABBABBBABBBABB-      Formula V

In some embodiments, a copolymer comprising the multifunctional boronic acid crosslinking agent can comprise at least one water-soluble monomer unit. Suitable water-soluble monomer units can include, for example, an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof.

In various embodiments, a copolymer comprising the multifunctional boronic acid crosslinking agent can comprise at least one boronic acid monomer unit, particularly a boronic acid monomer unit containing a polymerizable vinyl, allyl or acrylic functional group. In some embodiments, the at least one boronic acid monomer unit can comprise an aryl boronic acid. In other embodiments, the at least one boronic acid monomer unit can comprise an alkyl, alkenyl or alkynyl boronic acid (i.e., aliphatic boronic acids). It should be noted that the classification of a boronic acid as aryl, alkyl, alkenyl or alkynyl refers to the point of attachment of the boronic acid group. That is, for example, an aryl boronic acid has a boronic acid or a boronate ester derivative thereof attached to an aryl ring, and an alkenyl boronic acid has a boronic acid or boronate ester derivative thereof attached to an alkenyl group. As previously noted, a boronic acid can have additional functionality elsewhere in the molecule. For example, an aryl boronic acid can have an alkenyl functionality elsewhere in the molecule that is not attached to the boronic acid functionality. A number of functionalized boronic acid derivatives are available from a wide array of commercial vendors.

Conventionally produced multifunctional boronic acid crosslinking agents can be synthesized by combining at least one water-soluble monomer unit and at least one boronic acid monomer unit and allowing polymerization to occur, for example, by free radical polymerization. This type of conventional synthesis can lead to gradient copolymer formation, as demonstrated in the Examples below. Typically, the synthesis of multifunctional boronic acid copolymers can be carried out by emulsion polymerization, although solution polymerization can also be used. Most often, an elevated pH can be needed to fully dissolve a boronic acid monomer unit (e.g., pH>~11). Lower pH values can also be used for some boronic acids, particularly if electron withdrawing groups are present to stabilize the boronate conjugate base. At elevated pH values, conventional free radical-induced chain polymerizations may not run effectively, and oftentimes highly reactive hydroxyl radicals can be formed. In addition, under such conditions, boronic acid monomer units can react more rapidly than do other monomer units, thereby facilitating gradient copolymer formation. As a further difficulty, emulsions obtained from such high pH polymerizations can be difficult to invert into purely aqueous-based systems.

In order to address the foregoing difficulties with free radical emulsion polymerization of boronic acid monomer units, we have discovered several techniques that can reduce the amount of gradient character in a multifunctional boronic acid crosslinking agent. These techniques can be readily applied to many different types of living radical polymerization reactions. Illustrative living radical polymerization techniques that can be suitable for producing a multifunctional boronic acid crosslinking agent can include, for example, catalytic chain transfer, including cobalt-mediated radical polymerization; iniferter polymerization; stable free radical mediated polymerization; atom transfer radical polymerization; reversible addition fragmentation chain transfer polymerization; iodine-transfer polymerization; selenium-centered radical-mediated polymerization; tellurium-mediated polymerization; and stibine-mediated polymeration. These polymerization techniques are well known to one having ordinary skill in the art. Any other living radical polymerization technique that can be envisioned by one having ordinary skill in the art can also be compatible with the present embodiments as well.

In a first technique, it has been discovered that boronic acid monomer units can be more easily polymerized when a solubilizing agent is present, which can also protect at least a portion of the boronic acid functionalities as a boronate ester. By including a solubilizing agent and/or protecting boronic acid functionalities with the solubilizing agent before or during a polymerization reaction, a boronic acid monomer unit can be made soluble at a lower pH (e.g., ~9), which can lead to its more effective polymerization. In addition, by further lowering the pH after polymerization occurs, at least a portion of any boronate esters present can be cleaved to the parent boronic acid moieties, such that they are available for crosslinking in a treatment fluid.

In various embodiments, treatment fluids of the present invention can comprise a solubilizing agent that comprises at least two hydroxyl groups. In some embodiments, at least a portion of the boronic acid monomer units in a multifunctional boronic acid crosslinking agent can be functionalized with the solubilizing agent to form a boronate ester. Without being bound by theory or mechanism, it is believed that a solubilizing agent having at least two hydroxyl groups disposed such that they can form a 5- or 6-membered ring boronate ester with a boronic acid monomer unit can be particularly effective. Although any compound can be used that can form a 5- or 6-membered ring boronate ester, it is generally preferred that the compound contain functionality that further facilitates the water solubility of the multifunctional boronic acid crosslinking agent. Generally, functionalities that can facilitate water solubility can include, for example, hydroxyl groups, amines and/or carboxylic acid groups. In some embodiments, suitable solubilizing agents can include, for example, short chain polyols (e.g., glycerol, erythritol, pentaerythritol, and the like), a polysaccharide (e.g., sucrose, glucose, fructose, sorbitol, and the like), amino sugars, sugar alcohols, sugar acids, polyvinyl alcohol, tartaric acid, a catechol, a glycol (e.g., ethylene glycol, propylene glycol, and the like), any derivative thereof, and any combination thereof. In addition to the possible formation of a boronate ester, the solubilizing agent can also promote solubility by acting as a co-solvent and/or lowering the interfacial tension between water and the boronic acid monomer units. That is, in some embodiments, more than a stoichiometric amount of solubilizing agent can be used relative to the boronic acid monomer units.

In some embodiments, the multifunctional boronic acid crosslinking agent can comprise a reaction product of at least one boronic acid monomer unit, at least one water-soluble monomer unit, and a solubilizing agent. In some embodiments, the solubilizing agent can be selected from a short chain polyol, a polysaccharide, an amino sugar, a sugar alcohol, a sugar acid, polyvinyl alcohol, tartaric acid, a catechol, a glycol, any derivative thereof, or any combination thereof, for example. In some embodiments, the boronic acid monomer unit can be functionalized with the solubilizing agent (e.g., as a boronate ester) prior to being reacted with the water-soluble monomer unit. An advantage of this approach can be that the boronate ester becomes more soluble, particularly at lower pH values, than is the parent boronic acid monomer unit. In other embodiments, the boronic acid monomer unit can be reacted in situ with the solubilizing agent in a combined reaction mixture containing the boronic acid monomer unit, the water-soluble monomer unit and the solubilizing agent. An advantage of this approach can be that a separate step of functionalizing the boronic acid is not needed.

In some embodiments, the solubilizing agent can be removed from the multifunctional boronic acid crosslinking agent before it is placed in a treatment fluid. That is, in such embodiments, the solubilizing agent can simply facilitate the synthesis of the multifunctional boronic acid crosslinking agent.

In some embodiments, a multifunctional boronic acid crosslinking agent having at least a portion of its boronic acid monomer units functionalized as boronate esters can be included in a treatment fluid. For example, a multifunctional boronic acid crosslinking agent can have at least a portion of its boronic acid monomer units functionalized as boronate esters of the previously described solubilizing agents. In some embodiments, the treatment fluid can have its pH adjusted such that at least a portion of the boronate esters are hydrolyzed in situ in the treatment fluid either prior to or after being introduced into a subterranean formation. For example, the pH can be reduced to about 6 or below in some embodiments or to about 7 or below in other embodiments to hydrolyze the boronate esters. In some embodiments, the pH or temperature of the subterranean formation can initiate the hydrolysis of the boronate esters. After hydrolysis of at least a portion of the boronate esters, the multifunctional boronic acid crosslinking agent can be operable for crosslinking a gelling agent such as, for example, a biopolymer. As one of ordinary skill in the art will recognize, the rate of hydrolysis of a boronate ester will be dependent upon a number of factors including, for example, the pH conditions, the temperature, and the steric and electronic properties of the solubilizing agent and the boronic acid monomer unit. Accordingly, through routine experimentation, one having ordinary skill in the art will be able to formulate a treatment fluid containing a multifunctional boronic acid crosslinking agent having a desired rate of hydrolysis such that hydrolysis occurs at a desired time and to a desired degree.

In some embodiments, the multifunctional boronic acid crosslinking agent can comprise a reaction product of at least one boronic acid monomer unit and at least one water-soluble monomer unit, where the at least one boronic acid monomer unit is added continually (e.g., by dropwise or continuous infusion) or portionwise to a polymerization reaction mixture comprising the at least one water-soluble monomer unit. In some embodiments, addition of the at least one boronic acid monomer unit to the reaction mixture can be started, and the polymerization reaction can then be initiated (e.g., by adding an initiator). In other embodiments, the polymerization reaction can be initiated with only the water-soluble monomer unit in the reaction mixture, and addition of the at least one boronic acid monomer unit can then be started. In still other embodiments, initiation of the polymerization reaction and addition of the at least one boronic acid monomer unit can be started at the same time. In some embodiments, the at least one boronic acid monomer unit and an initiator can be added concurrently to a reaction mixture comprising the at least one water-soluble monomer unit.

An advantage of continuous or portionwise addition of the at least one boronic acid monomer unit can be that the faster-reacting boronic acid monomer unit is only present in small concentrations throughout the course of the polymerization reaction. Accordingly, as it reacts with the slower-reacting water-soluble monomer unit, the boronic acid monomer unit can be distributed more thoroughly throughout the length of the polymer chain. Additionally, since the concentration of the boronic acid monomer unit is purposefully kept low during continuous or portionwise addition, a lower pH value can sometimes be used to affect its solubility, as the lower concentration of the boronic acid monomer unit may be below its solubility limit. As previously noted, a lower pH value can be advantageous for inverting an emulsion containing the multifunctional boronic acid crosslinking agent. A further advantage of this approach is that removal of a solubilizing group is not a concern in order to release the free boronic acid functionality.

In some embodiments, the multifunctional boronic acid crosslinking agent can be a block copolymer including, but not limited to, a diblock, triblock or multiblock copolymer. An exemplary embodiment of a suitable diblock copolymer structure can include, but is not limited to, the structure generally represented by Formula VI, where m and n are integers and X represents a functionality bound to a monomer unit of the polymer backbone Formula VI

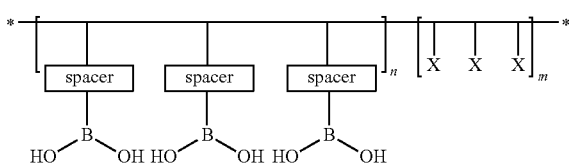

In various embodiments, the copolymers and block copolymers of Formulas III through VI can have an average molecular weight between about 1,000 Daltons and about 2,000,000 Daltons. For the multifunctional boronic acid crosslinking agents having the general structures shown in Formulas III through VI, the monomers within the polymer structure can be any suitable monomers that result in a water-soluble polymer molecule and do not interfere with the crosslinking of the boronic acid group with a gelling agent. Formulas III and VI illustrate that a boronic acid functional group can be directly bonded to the backbone of the polymer and/or the boronic acid functional group can be connected to the polymer backbone with an intervening spacer group.

In some embodiments, a multifunctional boronic acid crosslinking agent of the general structure shown in Formula III, can be synthesized by polymerization of a vinyl monomer containing a boronic acid functional group (e.g., 3-acrylamidophenyl boronic acid) and any suitable water-soluble monomer containing a vinyl group including, but not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides, alkyl dimethylammoniumethyl methacrylate halides, and alkyl dimethylammoniumpropyl methacrylamide halides. Other functional groups can also be present along the polymer backbone. In some embodiments, the boronic acid functional group can be grafted onto an already formed polymer backbone using techniques known to one having ordinary skill in the art. In some embodiments, as generally represented by Formulas III and VI, the ratio of the boronic acid monomer units to the other monomer units in the polymer can range from about 1:1 to about 1:200.

In some embodiments, the multifunctional boronic acid crosslinking agents of the present invention can comprise an equilibrium species. For example, the multifunctional boronic acid crosslinking agents can become protonated or deprotonated depending on pH. This feature can influence their solubility in a treatment fluid. Likewise, intramolecular interactions between atoms in the multifunctional boronic acid crosslinking agents of the present invention and the geometry of boron (e.g., tetrahedral or trigonal planar) can depend on pH and/or solvent (e.g., an alcohol-based solvent such as methanol). Thus, the exact chemical composition and geometry of the multifunctional boronic acid crosslinking agents of the present invention can depend on a particular equilibrium known to one of ordinary skill in the art. The geometry can also depend on the neighboring group participation in changing the steoreochemistry. For example, a nitrogen atom present in a neighboring group can share its lone pair of electrons with a boron to result in a tetrahedral geometry, which can allow for the formation of a bond to hydroxyl groups at a relatively neutral pH.

In some embodiments, a multifunctional boronic acid crosslinking agent can be prepared by incorporation of one or more of the monomer units listed above in the polymer synthesis with a boronic acid monomer unit. Formula VII illustrates an illustrative embodiment of the present invention, where x and y are integers and R is a hydrogen or an alkyl, alkenyl, alkynyl, aryl, heteroaryl, or cycloalkyl group. For example, a multifunctional boronic acid crosslinking agent according to Formula VII can be prepared by copolymerizing 3-acrylamidophenylboronic acid with an acrylamide monomer unit (e.g., N,N-dimethylacrylamide) in the ratio of about 1:1 to about 1:200 (e.g., a ratio of x:y ranging from about 1:1 to about 1:200) by free radical polymerization to provide the multifunctional boronic acid crosslinking agent.

Formula VII

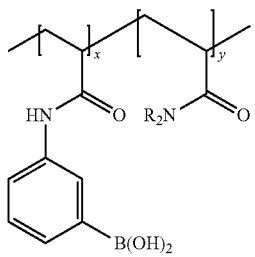

In another illustrative embodiment, a multifunctional boronic acid crosslinking agent can be prepared by copolymerizing 4-vinylphenylboronic acid and acrylamide. Such a copolymer has a structure represented by Formula VIII. In some embodiments, the 4-vinylphenylboronic acid can be protected as a boronate ester such as, for example, a polyol boronate ester. Such a copolymer has a structure represented by Formula IX. It should be understood that any vicinal hydroxyl groups in the polyol can react with the boronic acid, and the indicated structure in Formula IX should be considered illustrative in that regard. That is, other isomers can be formed. In both Formulas VIII and IX, x and y are integers. As previously noted, the solubilizing groups (e.g., the polyol) can be removed at some point after the synthesis of the copolymer to liberate the free boronic acid groups for crosslinking Formula VIII

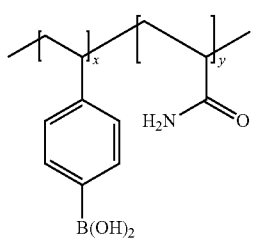

Formula IX

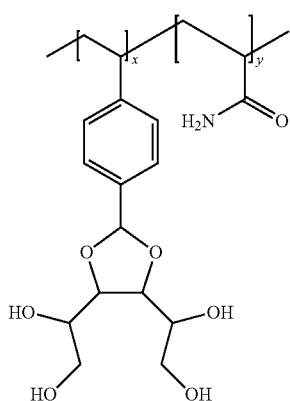

In yet another illustrative embodiment, the multifunctional boronic acid crosslinking agent can comprise a compound represented by Formula X, where x and y are integers and R is a hydrogen or an alkyl, alkenyl, alkynyl, aryl, heteroaryl, or cycloalkyl group.

Formula X

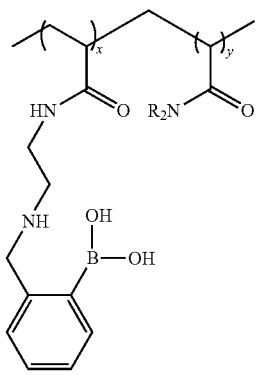

In this embodiment, the multifunctional boronic acid crosslinking agent can be prepared by copolymerizing 2-((2-acrylamidoethylamino)methyl)phenylboronic acid and an acrylamide in the ratio of about 1:1 to about 1:200 (e.g., a ratio of x:y ranging from about 1:1 to about 1:200 in Formula X) by free radical polymerization.

In still another illustrative embodiment, the multifunctional boronic acid crosslinking agent can be a difunctional boronic crosslinking agent having Formula XI, where u is an integer and R comprises a carbon, nitrogen, oxygen or sulfur atom. For example, when R is O or NH, the difunctional boronic acid crosslinking agent of Formula XI can be prepared by reacting two equivalents of 2-formylphenylboronic acid with one equivalent of oligomeric ethylene oxide or oligomeric ethylenediamine followed by reduction of the intermediate imine. In an embodiment, the reduction of the intermediate imine can be conducted using reductive amination techniques that are known to one having ordinary skill in the art (see generally S. L. Wiskur, et al., *Org. Lett.*, 3(9): 1311-14 (2001); A. E. Ivanov, et al., *Polymer*, 45:2495-2505 (2004)).

Formula XI

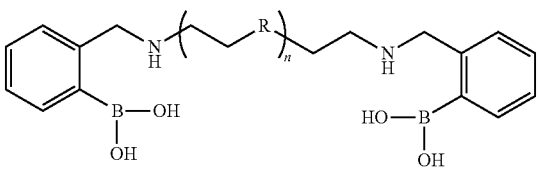

R = O, NH
n = 1-1000

The multifunctional boronic acid crosslinking agents of the present invention can be provided or used in any suitable form. For instance, the multifunctional boronic acid crosslinking agents can be a liquid, a gel, an emulsion, or a solid. The form of the multifunctional boronic acid crosslinking agent can depend on the specific choice of the multifunctional boronic acid crosslinking agent. For example, in certain embodiments, a multifunctional boronic acid crosslinking agent can be added in a quantity beyond the solubility limit in an aqueous fluid and thus, not be in an aqueous form. In other embodiments, a multifunctional boronic acid crosslinking agent can be dissolved, suspended, or emulsified in a liquid.

In other embodiments, a multifunctional boronic acid crosslinking agent can be used in a form that allows for a delayed release of the multifunctional boronic acid crosslinking agent, particularly within a subterranean formation. A delayed release can be desirable when a subterranean operation involves high temperature conditions, and release of the multifunctional boronic acid crosslinking agent can be desired after these high temperature conditions occur. For example, in a non-limiting embodiment, in wells with temperatures that require a second crosslinking agent to be present, the second crosslinking agent can be tailored to become available for crosslinking when a first crosslinking agent fails. A delayed release also can be desirable in a deep well or in a well requiring a long pump time. In this regard, multifunctional boronic acid crosslinking agents that contain at least some boronate ester protection therein can be particularly advantageous, since the boronic acid groups do not become available for crosslinking until hydrolysis of the boronate ester occurs. In certain embodiments, the multifunctional boronic acid crosslinking agents of the present invention can be encapsulated or enclosed within an outer coating that is capable of degrading at a desired time. Exemplary encapsulation methodologies are described in U.S. Pat. Nos. 5,373,901; 6,444,316; 6,527,051; and 6,554,071, the entire disclosures of which are incorporated herein by reference. In some embodiments, the crosslinking of a fluid can also be delayed by preparing the fluid at a low pH and adding an encapsulated pH adjusting agent that can raise the pH of the treatment fluid for crosslinking. A person having ordinary skill in the art, with the benefit of this disclosure, will recognize the appropriate encapsulation or coating technique to use with the multifunctional boronic acid crosslinking agents of the present invention.

In certain embodiments in which the multifunctional boronic acid crosslinking agents of the present invention are encapsulated, the multifunctional boronic acid crosslinking agents can comprise a coating or like containment means (e.g., to delay the release of the multifunctional boronic acid crosslinking agent). In general, suitable coating or containment means can be degradable materials in which the products of the degradation do not adversely affect the multifunctional boronic acid crosslinking agents. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. Examples of degradable materials that can be used as a coating or containment means in conjunction with the multifunctional boronic acid crosslinking agents of the present invention include, but are not limited to, polysaccharides, such as dextran or cellulose; chitins; chitosans; proteins; aliphatic polyesters; poly(lactides); poly (glycolides); poly($\epsilon$-caprolactones); poly(hydroxybutyrates); poly(anhydrides); aliphatic polycarbonates; orthoesters; poly(orthoesters); poly(amino acids); poly(ethylene oxides); and poly(phosphazenes). Other suitable degradable polymers include, for example, heat-sealable materials, other thermoplastic materials, or materials that can be dissolved with an appropriate solvent (e.g., hydroxypropylmethylcellulose, pectin, polyethylene oxide, polyvinyl alcohol, alginate, polycaprolactone, gelatinized starch-based materials, and the like). In certain exemplary embodiments, blends of these materials can be used.

The multifunctional boronic acid crosslinking agents of the present invention can be used to form a crosslinked gelling agent (e.g., in a treatment fluid). Under appropriate conditions (e.g., pH and temperature), the multifunctional boronic acid crosslinking agents of the present invention can allow one or more crosslinks to form between at least two gelling agent molecules. In addition, in some embodiments, treatment fluids comprising a multifunctional boronic acid crosslinking agent can exhibit viscoelastic behavior and can be broken using a pH shift to a less basic environment and reversibly formed by changing the pH back to a more basic environment.

The multifunctional boronic acid crosslinking agents of the present invention can be used to crosslink gelling agent molecules to form a viscosified treatment fluid. The multifunctional boronic acid crosslinking agents of the present invention generally can be present in an amount sufficient to provide a desired degree of crosslinking between gelling agent molecules, or to generate a desired viscosity or viscoelastic properties for a particular treatment fluid. In certain embodiments, the multifunctional boronic acid crosslinking agents can be present in the treatment fluid in an amount ranging from about 0.003% to about 1% by weight of the aqueous fluid therein. In some embodiments, the multifunctional boronic acid crosslinking agent can be added to a treatment fluid in an amount ranging from about 0.05 pounds per 1,000 gallons of treatment fluid ("lb/Mgal") to about 85 lb/Mgal. In another embodiment, the multifunctional boronic acid crosslinking agents can be added to a treatment fluid in an amount ranging from about 1 lb/Mgal to about 50 lb/Mgal. The amount of multifunctional boronic acid crosslinking agent added to the treatment fluid can depend on the gelling agents used, the structure of the multifunctional boronic acid crosslinking agent, the average molecular weight of the multifunctional boronic acid crosslinking agent, the number of boronic acid functional groups within the multifunctional boronic acid crosslinking agent, and the critical overlap concentration of the gelling agent or agents used in the treatment fluid, as described in more detail below.

The multifunctional boronic acid crosslinking agents, in some embodiments, can allow for the formation of a viscosified treatment fluid when the gelling agent is at a concentration below its critical overlap concentration. The critical overlap concentration (C*) of a gelling agent or agents can be described as that concentration necessary to cause polymer chain overlap the concentration above which the viscosity of a fluid containing the gelling agent is influenced not just by the weight percent of the individual gelling agent molecules, but also by the interaction of the individual molecules with one another). The value of C* can be used to denote the minimum concentration of gelling agent needed for effective crosslinking with a traditional crosslinker. C* is a concentration value expressed in "true percent" that denotes the concentration of gelling agent needed for optimum viscosity formation. The value of C* can be determined by measuring the viscosity of several concentrations of the gelling agent in an aqueous solution. While C* is related to molecular weight, it is only directly related within the same polymer in the same solution environment having different molecular weights. By way of example, a guar polymer having a molecular weight of 2,000,000 will likely have a different C* than a derivatized guar polymer having the same molecular weight. Moreover, changing the fluid environment can influence the C* of a polymer. For example, a guar polymer having a molecular weight of 2,000,000 can exhibit one C* in fresh water, but a different C* when methanol or a salt is added to the water. One having ordinary skill in the art will recognize the effect that additives such as methanol and salt can have on C* based on the expanding and contracting effect they have on the polymer while in the water. Without intending to be limited by theory, it is believed that a multifunctional boronic acid crosslinking agent can span between polymer chains to allow the formation of a crosslinked treatment fluid even when the treatment fluid comprises a gelling agent below its C* value.

Such interactions can depend on the structure of the multifunctional boronic acid crosslinking agent, the number of boronic acid functional groups included in the multifunctional boronic acid crosslinking agent, and the average molecular weight of the multifunctional boronic acid crosslinking agent. As noted above, embodiments of a multifunctional boronic acid crosslinking agent which are non-gradient or less gradient than conventionally synthesized copolymers can be particularly advantageous for allowing the gelling agent to be used below its C* value. Without being bound by theory or mechanism, it is believed that this ability can be due to a more uniform distribution of boronic acid monomer units over the whole of the polymer chain.

A variety of gelling agents can be used in the treatment fluids of the present invention. Suitable gelling agents typically can comprise biopolymers, synthetic polymers, or both. Without wishing to be limited by any particular theory, it is believed that in certain embodiments, a boronic acid functional group in a multifunctional boronic acid crosslinking agent can form a crosslink with suitably oriented hydroxyl groups on a gelling agent molecule to form a viscosified treatment fluid. Remaining unbound by theory or mechanism, it is believed that hydroxyl groups oriented in a 1,2-arrangement on the gelling agent can be particularly well oriented to react with the multifunctional boronic acid crosslinking agent. For example, in some embodiments, it is believed that a boronate ester linkage can be formed between the gelling agent and the multifunctional boronic acid crosslinking agent. In some embodiments, a multifunctional boronic acid crosslinking agent containing at least some boronate esters can react with a gelling agent through ester exchange reactions to form crosslinks. That is, it may not be necessary for a multifunctional boronic acid crosslinking agent containing boronate esters to first be hydrolyzed to a free boronic acid prior to forming a viscosified treatment fluid.

In some embodiments, suitable gelling agents can be biopolymers comprising polysaccharides, and derivatives thereof, including those that have one or more of the following monosaccharide units: galactose, mannose, glucoside, glucose, xylose, arabinose, fructose, glucuronic acid, or pyranosyl sulfate. Examples of suitable biopolymers can include, but are not limited to, guar, guar gum and derivatives thereof (e.g., hydroxypropyl guar and carboxymethylhydroxypropyl guar), cellulose and cellulose derivatives (e.g., carboxymethyl cellulose, carboxymethyl cellulose, and hydroxyethyl cellulose), and xanthan and derivatives thereof.

In some embodiments, the gelling agent, particularly a biopolymer, can be at least partially depolymerized. The term "depolymerized," as used herein, generally refers to a decrease in the molecular weight of the gelling agent molecule by removal of at least some of its monomer units. Depolymerized gelling agent molecules are described in U.S. Pat. No. 6,488,091, the entire disclosure of which is incorporated herein by reference.

In some embodiments, the gelling agent can comprise a water-soluble synthetic polymer. In some embodiments, the gelling agent can be a synthetic polymer containing hydroxyl groups such as, for example, polyvinyl alcohol. Synthetic polymers can be prepared by any suitable monomers known in the art, including those useful for forming the multifunctional boronic acid crosslinking agents. In some embodiments, suitable monomers useful in forming a synthetic polymer useful as a gelling agent can include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides alkyl dimethylammoniumethyl methacrylate halides, and alkyl dimethylammoniumpropyl methacrylamide halides. In some embodiments, these monomers and others can be copolymerized with monomers that contain hydroxyl groups suitable for crosslinking with a multifunctional boronic acid crosslinking agent. Illustrative synthetic polymers that can include the foregoing water-soluble monomers include, but are not limited to, polyacrylates, polymethacrylates, polyacrylamides, polyvinyl alcohol, polyvinylpyrrolidone, and their copolymers.

In certain embodiments, the gelling agent can be present in a treatment fluid in an amount ranging from about 0.1% to about 10% by weight of the aqueous fluid therein. In certain embodiments, the gelling agent can be present in the treatment fluid in an amount ranging from about 0.2% to about 4% by weight of the aqueous fluid therein.

In some applications, after a viscosified treatment fluid has performed its desired function, its viscosity may be reduced. For example, in a subterranean application, once the viscosified treatment fluid's viscosity has been reduced, it can be flowed back to the surface, and the well can be returned to production. Reducing the viscosity of a viscosified treatment fluid can occur by adjusting the pH of the treatment fluid so that crosslinks between gelling agent molecules become unstable or "delink." The terms "delink" or "delinking" refer to the reversible removal of crosslinks between at least two molecules that are crosslinked (e.g., crosslinked gelling agent molecules).

Although crosslinks between gelling agent molecules and the multifunctional boronic acid crosslinking agents can be delinked by changing the pH, any breaker can be used with the viscosified treatment fluids of the present invention. The term "breaker" refers to an agent that is capable of reducing the viscosity of a treatment fluid. For example, any breaker that is an acid, oxidizer, or enzyme known in the art can be used with the treatment fluids of the present invention. Suitable acid breakers can include mineral acids such as, for example, hydrochloric acid, sulfuric acid, or nitric acid. Suitable oxidizers can include, for example, persulfates, peroxides, and hypochlorites. In some embodiments, the breaker can be a delayed breaker such as a delayed release acid capable of lowering the pH of the treating fluid. Examples of delayed breakers which can be used include, but are not limited to, various lactones, esters, encapsulated acids and slowly soluble acid generating compounds, oxidizers which produce acids upon reaction with water, water reactive metals such as aluminum, lithium and magnesium and the like. The breaker can be included in the treatment fluid in an amount ranging from about 0% to about 1% by weight of the aqueous fluid therein. Enzyme breakers capable of generating acids can also be employed including, for example, alpha and beta amylases, amyloglucosidase, invertase, maltase, cellulose and hemi-cellulase. The specific delayed breaker used, whether or not it is encapsulated, as well as the amount thereof employed can depend upon the breaking time desired, the nature of the gelling agent and the multifunctional boronic acid crosslinking agent, subterranean formation characteristics and conditions and other factors.

The treatment fluids of the present invention also may comprise pH-adjusting agents. The pH-adjusting agents can be included in the treatment fluids to adjust the pH of the treatment fluids, inter a to facilitate the formation or delinking of crosslinks between gelling agent molecules. In some embodiments, multifunctional boronic acid crosslinking agents may not be capable of forming crosslinks between gelling agent molecules in acidic environments (e.g., at or below a pH ranging from about 6.0 to 7.0). Therefore, crosslinking or delinking can occur by adjusting the pH of the treatment fluid once it is placed in a desired location (e.g., in a well bore penetrating a subterranean formation). In certain embodiments in which the pH is to be increased (e.g., to facilitate crosslinking), suitable pH-adjusting agents can comprise a base. Examples of suitable bases can include, but are not limited to, sodium hydroxide, potassium hydroxide, lithium hydroxide, sodium carbonate, potassium carbonate, ammonium hydroxide or a combination thereof. In other embodiments in which the pH is to be decreased (e.g., to facilitate delinking), suitable pH-adjusting agents can include, but are not limited to, fumaric acid, formic acid, acetic acid, acetic anhydride, hydrochloric acid, sulfuric acid, hydrofluoric acid, hydroxyfluoroboric acid, polyaspartic acid, polysuccinimide, or a combination thereof. The identity and amount of the pH-adjusting agent can depend on, for example, the subterranean formation characteristics and conditions, the breaking or crosslinking time desired, and the nature of the multifunctional boronic acid crosslinking agent.

In some embodiments, the multifunctional boronic acid crosslinking agent can be crosslinked at a lower pH by inserting an electron withdrawing group in the multifunctional boronic acid crosslinking agent so that the pKa of the boronic acid group can be lowered. Without being bound by theory or mechanism, it is believed that an electron withdrawing group (e.g., a nitro group or a halogen) can remove electron density from the boronic acid, thereby making it more acidic by stabilizing the resultant boronate conjugate base. In some embodiments, the multifunctional boronic acid crosslinking agent can comprise a monomer or functional group capable of changing the geometry of the boronic acid from a planar configuration to a tetrahedral configuration. For example, an appropriately located nitrogen atom can donate its lone pair of electrons to the open p-orbital on boron, thereby forming a tetrahedral complex. Formation of the complex can allow the multifunctional boronic acid crosslinking agent to crosslink in a treatment fluid at a lower pH. In some embodiments, a treatment fluid having a tetrahedral boronic acid complex can be crosslinked at a pH ranging from about 5 to about 8.

In addition, the treatment fluids of the present invention can further comprise a buffer. Buffers can be used to maintain a treatment fluid's pH in a limited range. Examples of suitable buffers can include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, and the like. When used, the buffer can be included in an amount sufficient to maintain the pH of the treatment fluids at a desired level. In an embodiment, a buffer can be included in an amount ranging between about 0.5% to about 10% by weight of the aqueous fluid therein. One of ordinary skill in the art, with the benefit of this disclosure, will recognize the appropriate buffer and amount to use for a chosen application.

The treatment fluids of the present invention optionally can comprise particulates (e.g., proppant particulates or gravel particulates). Particulates suitable for use in the present invention can comprise any material suitable for use in subterranean operations. Suitable materials for these particulates can include, but are not limited to, sand, bauxite, ceramic materials, glass materials, polymer materials, polytetrafluoroethylene materials (such as TEFLON, commercially available from DuPont), nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates can comprise a binder and a filler material, wherein suitable filler materials can include silica, alumina, filmed carbon, carbon black, graphite, mica, titanium dioxide, meta-silicate, calcium silicate, kaolin, talc, zirconia, boron, fly ash, hollow glass microspheres, solid glass, and any combination thereof. The particulate size generally can range from about 2 mesh to about 400 mesh on the U.S. Sieve Series; however, in certain circumstances, other sizes may be desired and will be entirely suitable for practice of the present invention. In particular embodiments, preferred particulate size distribution ranges can be one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments. In certain embodiments, the particulates included in the treatment fluids of the present invention can be coated with any suitable resin or tackifying agent known to one having ordinary skill in the art. In certain embodiments, the particulates can be present in a treatment fluid in an amount ranging from about 0.5 pounds per gallon ("ppg") to about 30 ppg by volume of the treatment fluid.

Additional additives can be included in the treatment fluids of the present invention as deemed appropriate by one having ordinary skill in the art and having the benefit of this disclosure. Examples of such additives can include, but are not limited to, fluid loss control agents, surfactants, dispersing agents, weighting agents, scale inhibitors, clay stabilizers, silicate-control agents, antifoaming agents, foaming agents, biocides, biostatic agents, storage stabilizers, and any combination thereof.

The treatment fluids of the present invention can be used in various subterranean operations, as described in more detail below. In various embodiments, methods described herein can include providing a treatment fluid that comprises an aqueous base fluid, a gelling agent, and a multifunctional boronic acid crosslinking agent comprising a copolymer that comprises at least one boronic acid monomer unit and at least one water-soluble monomer unit; and introducing the treatment fluid into a subterranean formation.

In some embodiments, the treatment fluids of the present invention can be used for carrying out a variety of subterranean well treatments such as, for example, fracturing operations and gravel packing operations. When used in conjunction with fracturing operations, fracturing fluids (i.e., a treatment fluid) comprising an aqueous base fluid, a gelling agent and a multifunctional boronic crosslinking agent can be introduced into a subterranean formation at a pressure sufficient to create or enhance at least one fracture therein. Proppant particulates can also be included. In some embodiments, the multifunctional boronic acid crosslinking agent can comprise a copolymer that comprises at least one boronic acid monomer unit and at least one water-soluble monomer unit. In some embodiments, the multifunctional boronic acid crosslinking agent may not comprise a gradient copolymer, such as those produced by conventional synthetic techniques. Techniques for synthesizing copolymers having reduced gradient character have been set forth herein. After the fracturing fluid has performed its desired function, or after a desired time has passed, the viscosity of the fracturing fluid can be reduced and the fluid recovered.

When used in conjunction with gravel packing operations, gravel packing fluids (i.e., a treatment fluid) comprising an aqueous base fluid, gravel, a gelling agent and a multifunctional boronic acid crosslinking agent can be placed in or near a portion of a subterranean formation so as to create a gravel pack. After the gravel pack is substantially in place, the viscosity of the gravel packing fluid can be reduced to a desired degree and recovered.

The present invention also provides methods of reusing treatment fluids or any component, or combination of components, therein. In general, the treatment fluids of the present invention can be reused because gelling agents crosslinked using the multifunctional boronic acid crosslinking agents can be delinked. In certain embodiments, reuse of the treatment fluids of the present invention can involve delinking the gelling agents to a sufficient degree so as to remove the crosslinks to at least one gelling agent molecule thereby forming a "delinked gelling agent." These delinked gelling agents can then be crosslinked again (e.g., to increase the viscosity of the same or a different treatment fluid). In certain embodiments, one or more components of a treatment fluid comprising delinked gelling agents can be reused. For example, the gelling agent or the water of a viscosified treatment fluid may be reused. Reusing viscosified treatment fluids is described U.S. Pat. No. 7,082,995, the entire disclosure of which is incorporated herein by reference.

In some embodiments, methods of treating a subterranean formation can comprise providing a treatment fluid comprising: an aqueous base fluid, a gelling agent, and a multifunctional boronic acid crosslinking agent comprising at least one boronic acid functional group; and introducing the viscosified fluid into a subterranean formation. In some embodiments, the treatment fluid can be contacted with a breaker, and the viscosity of the treatment fluid can be allowed to decrease. The treatment fluid can then be re-crosslinked to increase the viscosity of the treatment fluid as desired.

In another embodiment, the treatment fluid can be used for a fracturing operation. A method of fracturing a subterranean formation can comprise providing a treatment fluid comprising: an aqueous base fluid; a gelling agent; and a multifunctional boronic acid crosslinking agent; and introducing the treatment fluid into a subterranean formation at a pressure sufficient to create or enhance at least one fracture within the subterranean formation. In some embodiments, the treatment fluid can be contacted with a breaker, and the viscosity of the treatment fluid can be allowed to decrease. The treatment fluid can then be re-crosslinked to increase the viscosity of the treatment fluid as desired.

To facilitate a better understanding of the present invention, the following examples of certain aspects of some embodiments are given. In no way should the following examples be read to limit, or define, the scope of the invention.

EXAMPLES

Example 1

Rheological Properties of Crosslinked Treatment Fluids

A first sample labeled Sample 1 was prepared by mixing 35 lb/Mgal (i.e., pounds per 1,000 gallons of base fluid) of "WG-35" gelling agent (a guar based gelling agent commercially available from Halliburton Energy Services, Inc., of Duncan, Okla.) and 1% by volume borate crosslinker "BC-140" (monoethanolamine borate/ethylene glycol, commercially available from Halliburton Energy Services, Inc., of Duncan, Okla.). These two components were mixed in de-ionized water to form a final boron concentration in the gel of 400 µmol. The pH of the first sample was 8.5.

A second sample labeled Sample 2 was prepared by mixing 35 lb/Mgal of "WG-35" gelling agent hydrate in deionized water and 0.0115 g of a multifunctional boronic acid crosslinking agent. The final concentration of boron in the gel was 2.5 µmol. The pH of the second sample was 8.42. The rheological properties of the two samples are shown in FIG. 1. In FIG. 1, several rheological parameters are shown including the Storage (Elastic) Modulus (G'), the Viscous (Loss) Modulus (G"), and the Complex Viscosity (f').

As shown in FIG. 1, it was observed that Sample 2, comprising the multifunctional boronic acid crosslinking agent, demonstrated stiffer gel properties with a higher elastic modulus, viscous modulus, and viscosity than the corresponding elastic modulus, viscous modulus, and viscosity for Sample 1. The sample comprising the multifunctional boronic acid crosslinking agent achieved viscoelastic properties at higher efficiency and at a lower concentration of added crosslinker.

Example 2

Rheological Properties of Crosslinked Treatment Fluids

In this example, the viscoelastic properties of two crosslinked fluids are compared. A sample called Sample 3 was prepared by mixing 35 lb/Mgal of "WG-35" gelling agent and 3% v/v of borate crosslinker "BC-140." The balance of the sample was de-ionized water. Another sample called Sample 4 was prepared by mixing 35 lb/Mgal of "WG-35" gelling agent, 1% v/v of "BC-140" and 0.9% of a multifunctional boronic acid crosslinking agent. The viscoelastic properties of the two samples are shown in FIG. 2.

Figure 2:
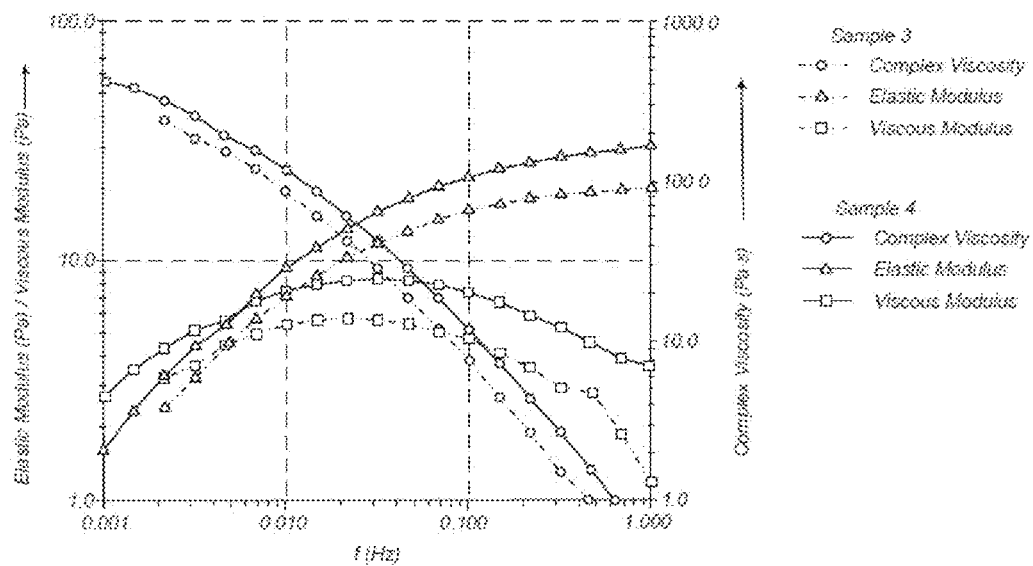
FIG. 2 illustrates the experimental results of a frequency sweep analysis of another embodiment of a viscosified fluid comprising a multifunctional boronic acid crosslinking agent.

As shown in FIG. 2, it was observed that Sample 4, comprising the multifunctional boronic acid crosslinking agent, demonstrated improved viscoelastic properties including a higher elastic modulus, viscous modulus and viscosity than the corresponding elastic modulus, viscous modulus and viscosity for Sample 3. The viscoelastic properties of the gel were enhanced beyond the levels achievable using traditional borate crosslinkers.

Example 3

Temperature Stability of Crosslinked Treatment Fluids

Figure 3:
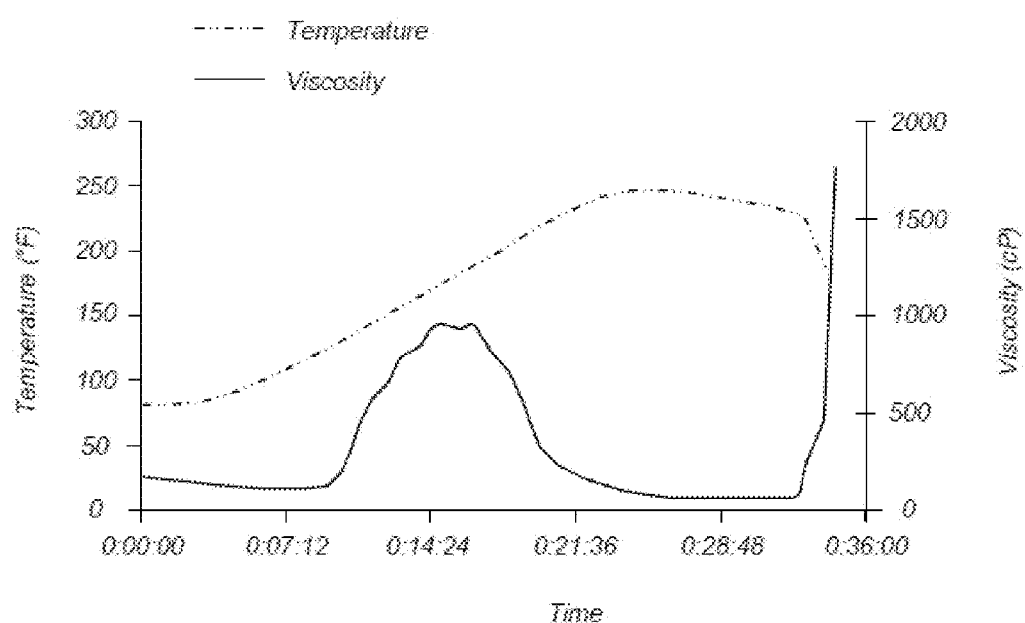
FIG. 3 illustrates the experimental results of a steady shear viscosity analysis of an embodiment of a viscosified fluid comprising a multifunctional boronic acid crosslinking agent.

The multifunctional boronic acid crosslinking agents can also be used to improve the temperature stability of a viscosified fluid. In this example, a viscosified fluid labeled Sample 5, comprising 35 lb/Mgal of "WG-35" gelling agent and 0.053% w/w of a multifunctional boronic acid crosslinking agent, was prepared at a pH of 9.2. Sample 5 demonstrated a relatively high viscosity at 40 s$^{-1}$, even at approximately 200° F. The results of the temperature and viscosity measurements are shown in FIG. 3. As shown in FIG. 3, the sample comprising the multifunctional boronic acid crosslinking agent demonstrated temperature stability.

Example 4

Concentration Effects of Crosslinked Treatment Fluids

Figure 4:
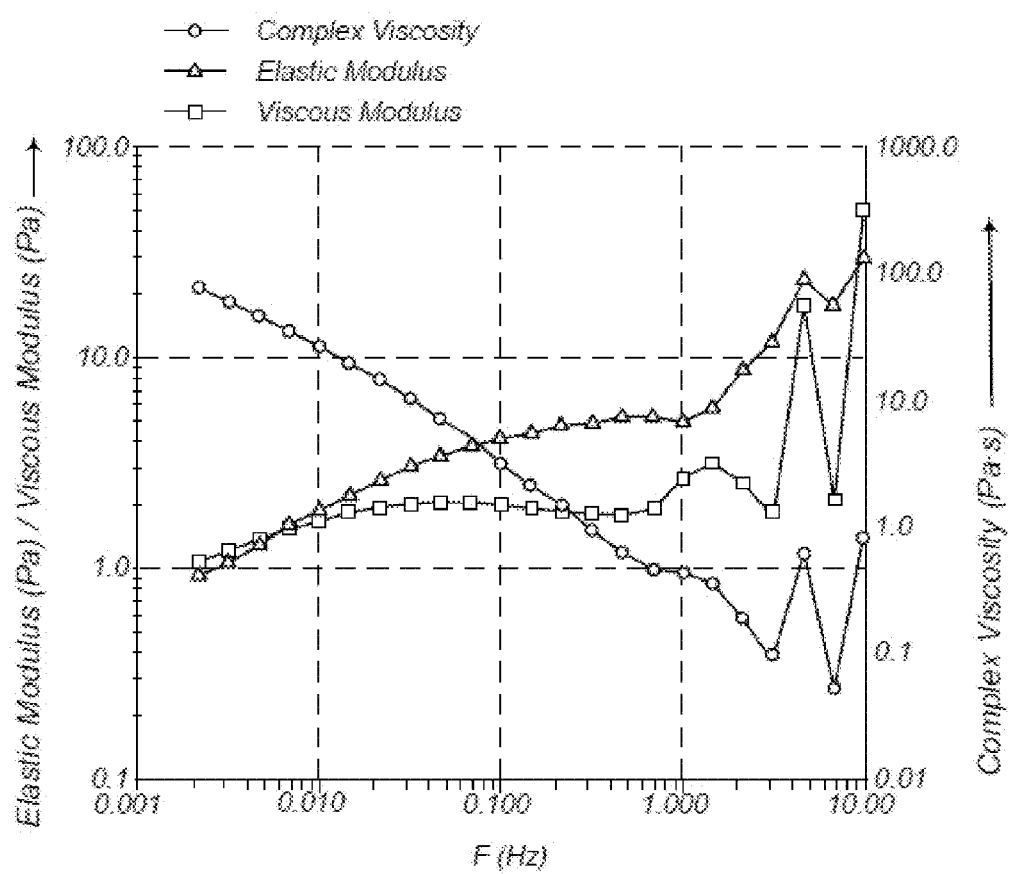
FIG. 4 illustrates the experimental results of a frequency sweep analysis of still another embodiment of a viscosified fluid comprising a multifunctional boronic acid crosslinking agent.

A sample labeled Sample 6 was prepared by mixing 40 lb/Mgal of a gelling agent and 9.5 lb/Mgal of a multifunctional boronic acid crosslinking agent at a pH of 9.4. The frequency sweep response curves including the elastic modulus, viscous modulus, and viscosity are shown in FIG. 4. A traditional borate-type crosslinking agent is not generally able to form a viscoelastic gel at this gelling agent concentration, which is below C* for this sample, regardless of the amount of crosslinking agent placed in the formulation. This result demonstrates that using a multifunctional boronic acid crosslinking agent can advantageously form a viscoelastic gel below the C* for the fluid in some embodiments.

Example 5 pH Effects of Crosslinked Treatment Fluids

Figure 5:
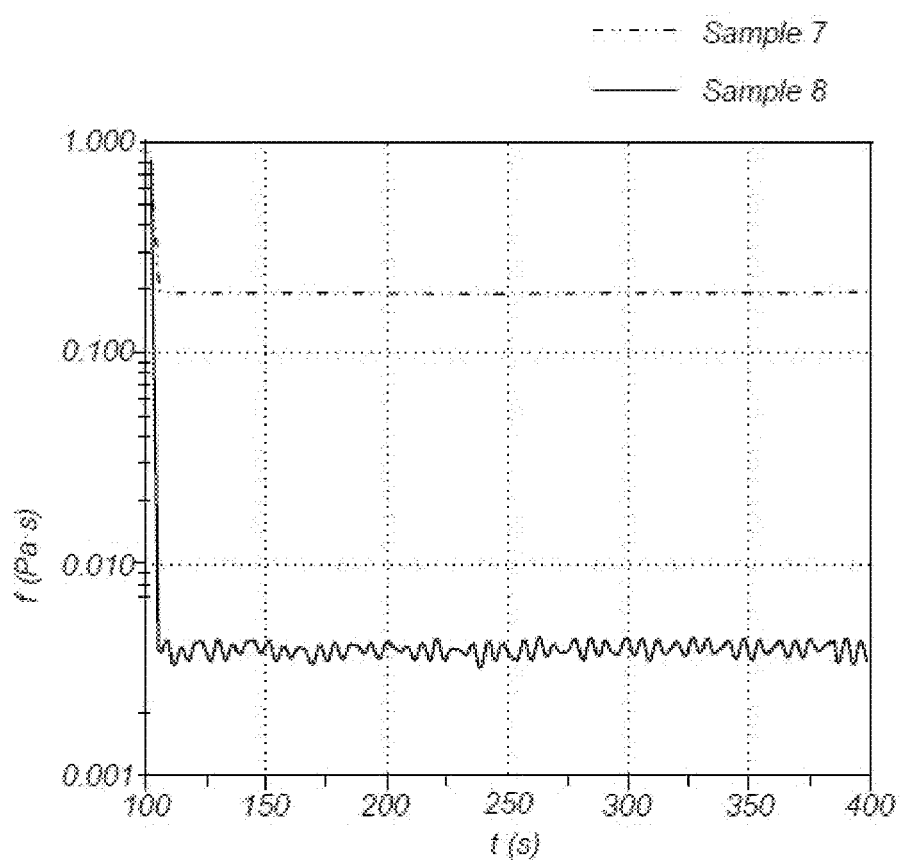
FIG. 5 illustrates the experimental results of a steady shear viscosity analysis of another embodiment of a viscosified fluid comprising a multifunctional boronic acid crosslinking agent.

Two gel samples with similar viscoelastic profiles were prepared. The first sample was labeled Sample 7 and comprised 35 lb/Mgal of "WG-35" and 0.2% by weight of a multifunctional boronic acid crosslinking agent. The second sample was labeled Sample 8 and comprised 35 lb/Mgal of "HMP" (a Halliburton MicroPolymer™ fluid commercially available from Halliburton Energy Services, Inc., of Duncan, Okla.) crosslinked with an identical amount of the same crosslinking agent. The steady shear viscosity of the samples was measured on a Haake rheometer at 40 $s^{-1}$. The gels formed normal viscoelastic networks at a pH ranging from about 8-12. When the pH was lowered, each gel dropped to a free flowing liquid. However, the steady shear viscosity for the viscosified fluid comprising "HMP" was significantly lower than the viscosified fluid comprising "WG-35," which may be due to the smaller gel polymers in "HMP." The results are shown in FIG. 5.

Example 6

Synthesis of a Multifunctional Boronic Acid Crosslinking Agent

A copolymer of N,N-dimethyl acrylamide and 3-acrylamidophenyl boronic acid was synthesized according to the following protocol. N,N-Dimethylacrylamide (1.8 g) and 3-acrylamidophenyl-boronic acid (0.38 g) were dissolved in 18 ml of water. The solution was purged with argon for 15 minutes. Potassium persulfate (7 mg) was added to the solution along with N,N,N',N'-tetramethylethylenediamine (7 mg). The solution was kept in a water bath at 50° C. for 5 hours. The material polymerized into a thick gel that was diluted for subsequent use as a crosslinking agent.

Example 7

Synthesis of a Multifunctional Boronic Acid Crosslinking Agent

Ethylenediamine (4.01 g, 66.7 mmol) and 2-formylphenyl-boronic acid (10 g, 66.7 mmol) were mixed in 1,2-dichloroethane (350 ml) and then treated with sodium triacetaxyborohydride (19.79 g, 93 mmol). The reaction is believed to proceed according to Scheme 1.

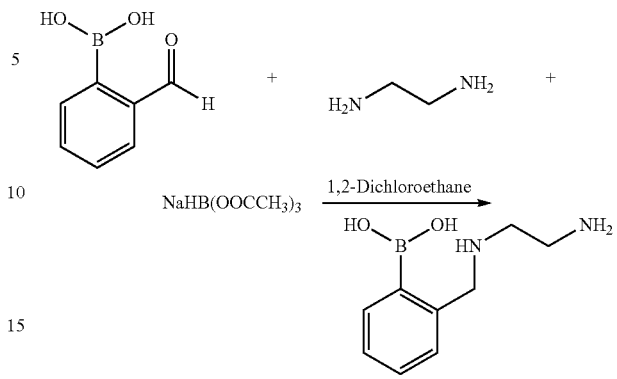

The reaction mixture was stirred at room temperature under argon atmosphere for 2 hours until the reactants were consumed as determined by thin layer chromatography. The reaction mixture was quenched by adding saturated aqueous sodium bicarbonate, and the product was extracted with ethyl acetate. The ethyl acetate extract was dried (MgSO$_4$) and the solvent was evaporated to give the crude free base comprising 2-((2-aminoethylamino)methyl)phenylboronic acid.

2-((2-aminoethylamino)methyl)phenylboronic acid (4.3 g, 22.16 mmol) was dissolved in 50 ml of 2 M NaOH (3.54 g, 88.6 mmol) and cooled to 2° C. in an ice bath. Acryloyl chloride (4.01 g, 3.6 ml, 44.3 mmol) was added dropwise to the solution under intense magnetic stirring for 10-15 min. The reaction is believed to proceed according to Scheme 2.

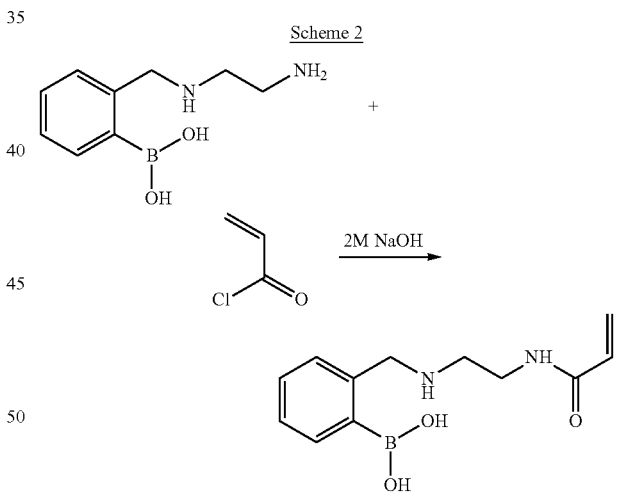

The solution was allowed to stir for an additional 1 hour. Hydrochloric acid (2 M) was added drop-wise to the reaction mixture in order to adjust its pH to about 1. A white product precipitated. The white precipitate was separated by filtration on a Buckner funnel and washed with chilled water (100 ml). The collected precipitate was dried under vacuum to afford 4.6 g of the final product comprising 2-((2-acrylamidoethylamino)methyl)phenylboronic acid.

2-((2-acrylamidoethylamino)methyl phenylboronic acid (0.338 g, 1.563 mmol) and acrylamide (1 g, 14.07 mmol) were dissolved in 12.4 ml of water. A small amount of 1 N NaOH solution was added to dissolve the boronic acid. The solution was purged with argon for 15 minutes, 3.72 mg of sodium persulfate and 3.72 mg of TEED were added to this solution. The solution was kept in 45° C. for 2 hours and formed a thick polymer solution. The reaction is believed to proceed according to Scheme 3, where the indicated polymer stoichiometry is based upon that of the starting materials and the placement of the monomer units is arbitrary.

Scheme 3

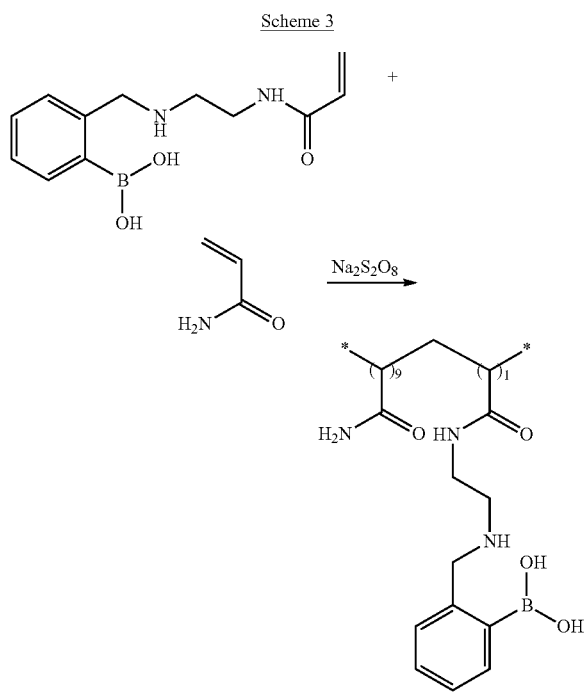

Example 8

Figure 6:
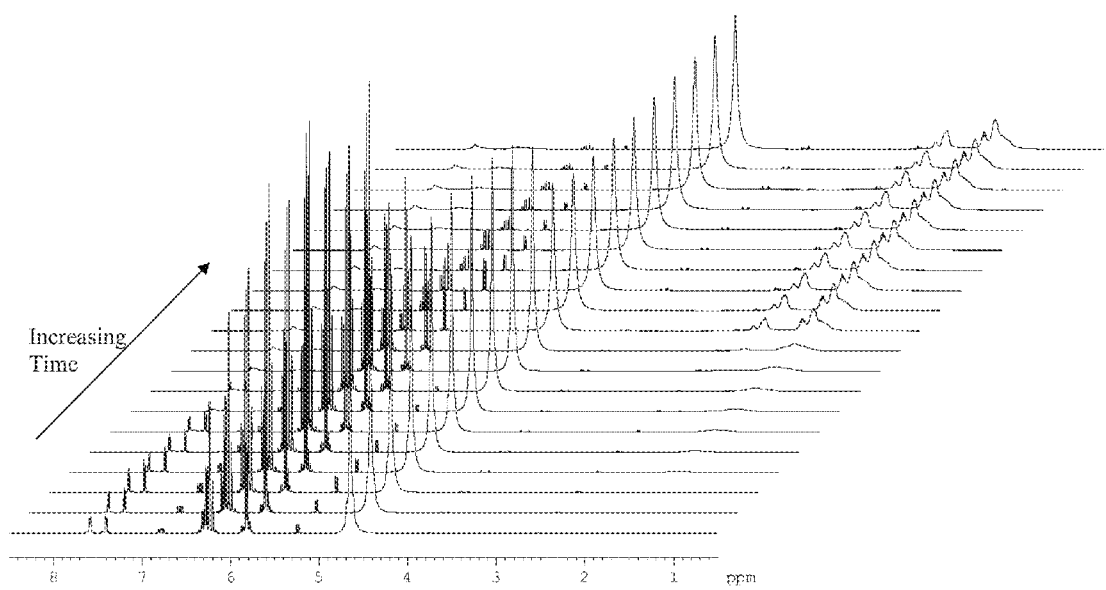
FIG. 6 shows a time-dependent $^1$H NMR analysis of the reaction of acrylamide and 4-vinylphenylboronic acid at 45° C. and a pH of 11.0.

Synthesis and Characterization of a Multifunctional Boronic Acid Crosslinking Agent Gradient Copolymer A mixture comprising 9.1 equivalents of acrylamide and 0.9 equivalents of 4-vinylphenyl boronic acid was prepared at a pH of approximately 11.0 in $D_2O$ containing $K_2CO_3$ and 2.1% ammonium persulfate. The reaction mixture was heated at 45° C. for 2.5 hours, and the progress of the reaction was monitored by $^1$H NMR analysis. FIG. 6 shows a time-dependent $^1$H NMR analysis of the reaction of acrylamide and 4-vinylphenylboronic acid at 45° C. and a pH of 11.0. A copolymer having a structure related to that shown in Scheme 4 is believed to result, where the polymer stoichiometry indicated is based upon that of the starting materials and the placement of the monomer units is arbitrary.

Scheme 4

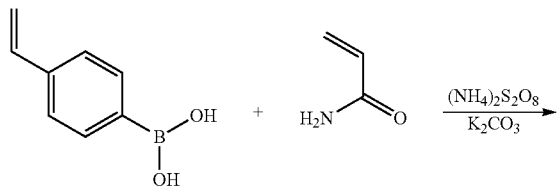

-continued

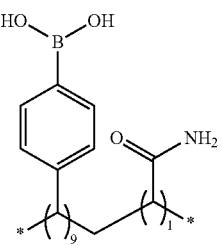

Figure 7:
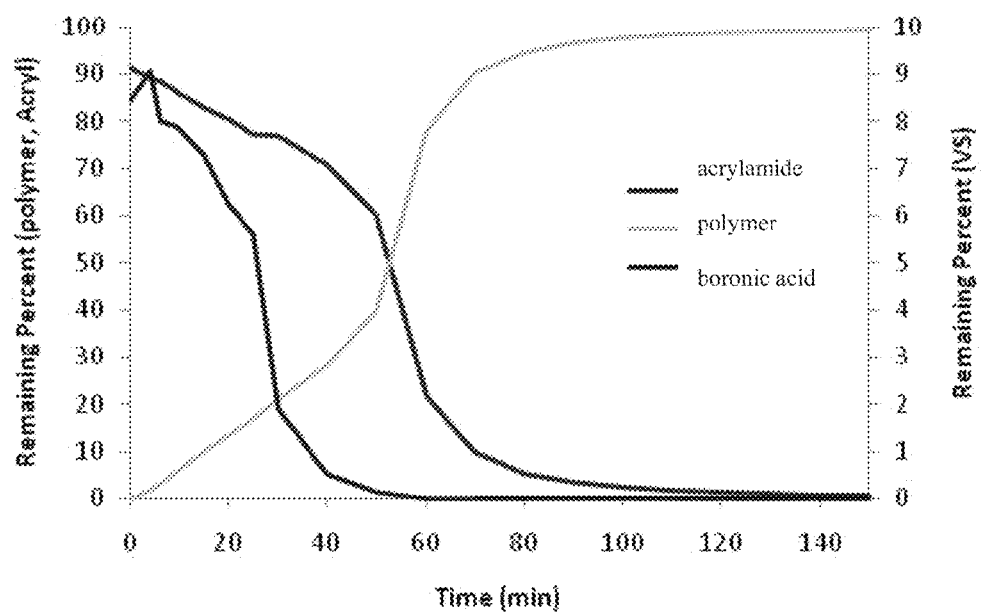
FIG. 7 shows a plot of the kinetic progress of the polymerization of acrylamide and 4-vinylphenyl boronic acid at 45° C. and a pH of 11.0 over time.

As shown in FIG. 6, the monomers reacted at significantly different rates such that the 4-vinylphenylboronic acid was substantially consumed at 50 minutes, at which point the polymer was only at about 40% conversion. That is, it is believed that there was still residual acrylamide monomer remaining that continued to react at the ends of the growing polymer chains. Determination of percent conversion was ascertained by integration of the starting material and product peaks in the $^1$H NMR. For example, after 50 minutes, the integration indicated that only about 20% of the acrylamide had been consumed, indicating that the initial 40% length of the copolymer contained a 3:1 ratio of acrylamide:boronic acid. It can thus be inferred that the remaining 60% length of the copolymer contained substantially only acrylamide monomers which continued to react. As a result, the monomers are not believed to be randomly distributed throughout the whole length of the polymer chain. FIG. 7 shows a plot of the kinetic progress of the polymerization of acrylamide and 4-vinylphenyl boronic acid at pH 11.0 over time.

Figure 8:
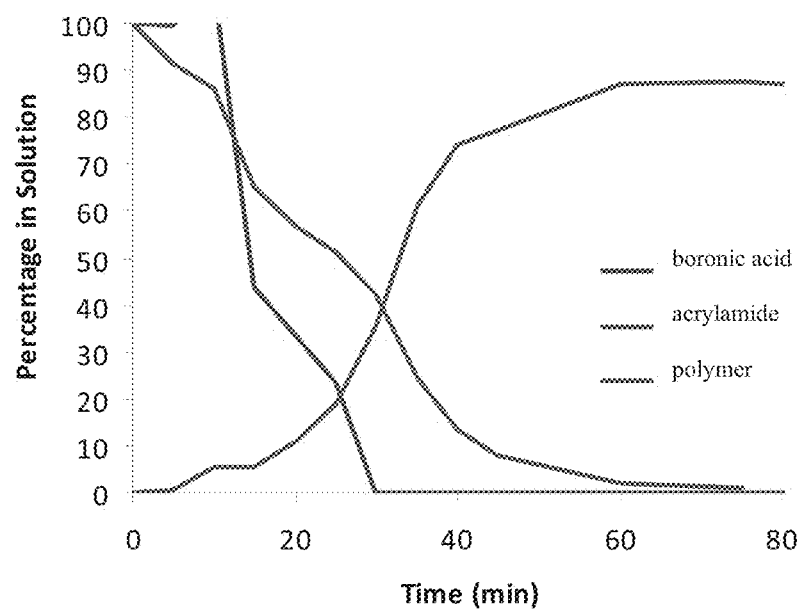
FIG. 8 shows a plot of the kinetic progress of acrylamide and 4-vinylphenyl boronic acid in the presence of sorbitol at 45° C. and a pH of 9.65 over time.

When the reaction was run in the presence of sorbitol as a solubilizing agent and/or protecting agent, the rate of consumption of the monomers was more similar. FIG. 8 shows a plot of the kinetic progress of acrylamide and 4-vinylphenyl boronic acid in the presence of sorbitol at 45° C. and a pH of 9.65 over time. As shown in FIG. 8, the boronic acid monomer was consumed less rapidly during the initial stages of the reaction. It should be noted that the polymerization reaction kinetics depicted in FIGS. 7 and 8 are not exactly analogous to one another, since the polymerization reaction run in the presence of sorbitol was conducted at a different pH. The lower pH is made possible by the monomer solubility conferred by the sorbitol.

Example 9

Increasing the Solubility of a Boronic Acid in the Presence of a Solubilizing Agent In this example, sorbitol was used as an illustrative solubilizing agent to improve the solubility of 4-vinylphenyl boronic acid. A stock solution of 20 g of sorbitol in 200 mL of deionized water was prepared to give a sorbitol concentration of 0.55 M. In several plastic sealable containers was placed 11-15 mg of the boronic acid (maximum of 0.1 mmol in each container), and a variety of solutions were added to the containers, sometimes with pH adjustment. Thereafter, the containers were vortex mixed for 5 minutes, and solubility was analyzed visually. Testing conditions and solubility results are summarized in Table 1.

TABLE 1

| Sample # | Conditions | Soluble? |
|---|---|---|
| 1 | 10 mL deionized $H_2O$ | no |
| 2 | 10 mL stock sorbitol | yes |
| 3 | 10 mL stock sorbitol, pH = 14 | yes |

TABLE 1-continued

| Sample # | Conditions | Soluble? |
|---|---|---|
| 4 | 200 µL stock sorbitol, 5 mL deionized $H_2O$ | no |
| 5 | 5 mL deionized $H_2O$, pH = 12.3 | yes |
| 6 | 1 mL stock sorbitol, 5 mL deionized $H_2O$ | no |
| 7 | 2 mL stock sorbitol, 6 mL deionized $H_2O$ | no |
| 8 | 200 µL stock sorbitol, 5 mL deionized $H_2O$, pH = 10.6 | no |
| 9 | 2 mL stock sorbitol, 6 mL deionized $H_2O$, pH = 11.0 | yes |
| 10 | 2 mL stock sorbitol, 10 mL deionized $H_2O$, pH = 10.4 | yes |
| 11 | 10 mL deionized $H_2O$, pH = 9.8 | no |
| 12 | 2 mL stock sorbitol, 10 mL deionized $H_2O$, pH = 9.2 | no |
| 13 | 2 mL stock sorbitol, 10 mL deionized: $H_2O$, pH = 9.4 | yes |

As shown for Samples 2, 3, 9, 10 and 13 solubility could be enhanced when sorbitol was present. It is believed that a boronate ester can form in these samples, as shown in Scheme 5. It should be noted in Scheme 5, other isomers are possible and the structure shown should be considered illustrative in nature only. Further, the stereochemistry has been omitted from the chemical structures.

Scheme 5

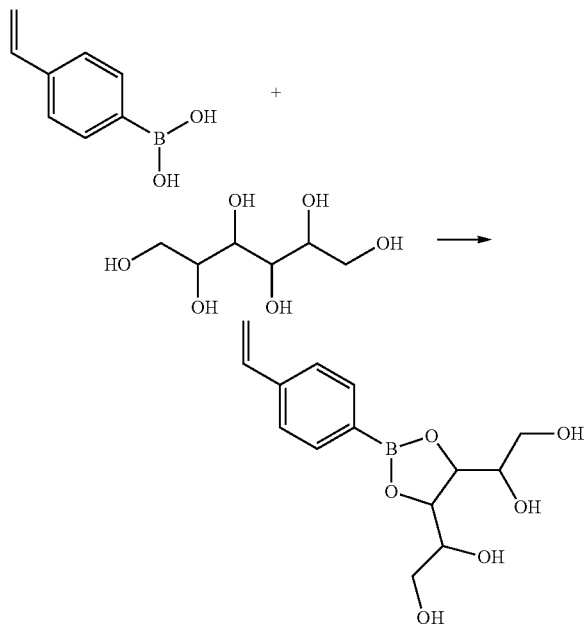

It is also possible that excess sorbitol can help solubilize the boronic acid or boronate ester by improving its compatibility with the solvent. Further, it is believed that the lower pH solutions containing soluble boronic acid or boronate esters (e.g., Sample 13) can be polymerized at lower pH than those illustrated in Example 8, such that the monomers react at more nearly the same rate (See FIG. 8). That is, it is believed that by conducting the polymerization reaction at a lower pH, a random copolymer or polymer having less gradient character can be produced.

Example 10

Computational Modeling of Gradient Copolymer Formation

Accelerys's Materials Studio was used to model gradient copolymer formation where monomers have different reaction rates. The software was used to computationally generate 50 random copolymers of ethylene and styrene, where the ethylene was used as an acrylamide substitute and the styrene was used as a 4-vinylbenzeneboronic acid substitute. For computational purposes, the inputted concentrations were 1 mole percent styrene and 99 mole percent acrylamide at a reactivity ratio of 1:5.3, respectively. The computationally determined polymers were set at 100 monomer units long with randomly determined angles between polymers to simulate realistic conditions.

Figure 9:
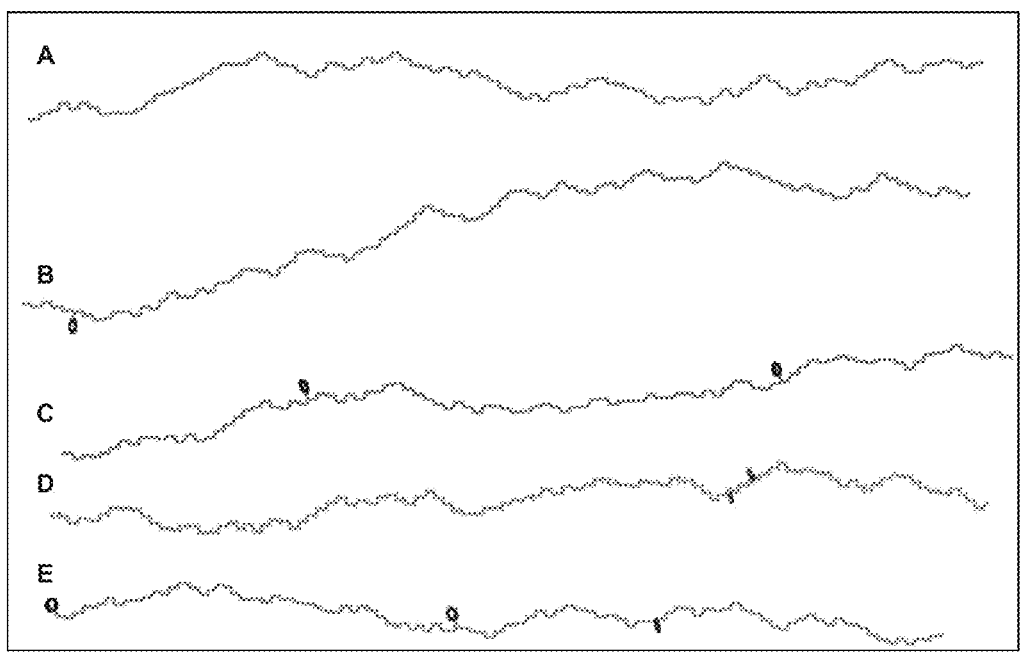
FIG. 9 shows a plot illustrating computationally determined polymer randomness.

FIG. 9 shows a plot illustrating computationally determined polymer randomness, determined as described above, where hash marks indicate the positions where styrene monomers were incorporated. 34% of the polymers incorporated no styrene (trace A). Only one styrene was incorporated in 42% of the polymers (trace B). 4% of the polymers incorporated two styrenes that were spatially separated from one another (trace C), whereas 10% of the polymers incorporated two styrenes that were not significantly separated spatially from one another (trace D). 10% of the polymers had 3 or more styrenes incorporated and spatially separated from one another (trace E). According to the modeling work, only 14% of the polymers had multiple styrene units spatially separated from one another (traces C and E). In a polymer system containing a boronic acid monomer unit, this would equate to only 14% of the polymers being operable to form crosslinks with one another and form a viscoelastic gel.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is the following:

1. A method comprising:
   providing a treatment fluid that comprises:
   an aqueous base fluid;
   a gelling agent; and
   a multifunctional boronic acid crosslinking agent comprising a copolymer that comprises at least one boronic acid monomer unit and at least one water-soluble monomer unit;
   wherein the at least one water-soluble monomer unit comprises a monomer selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof; and
   introducing the treatment fluid into a subterranean formation.

2. The method of claim 1, wherein the multifunctional boronic acid crosslinking agent comprises a random copolymer.

3. The method of claim 1, wherein the at least one boronic acid monomer unit comprises an arylboronic acid.

4. The method of claim 1, wherein the treatment fluid further comprises a solubilizing agent that comprises at least two hydroxyl groups.

5. The method of claim 4, wherein at least a portion of the boronic acid monomer units are functionalized with the solubilizing agent to form a boronate ester.

6. The method of claim 4, wherein the solubilizing agent comprises a compound selected from the group consisting of a short chain polyol, a polysaccharide, an amino sugar, a sugar alcohol, a sugar acid, a polyvinyl alcohol, tartaric acid, a catechol, a glycol, any derivative thereof, and any combination thereof.

7. The method of claim 1, wherein the gelling agent comprises a polymer comprising a plurality of hydroxyl functional groups.

8. The method of claim 7, wherein the gelling agent comprises a polymer selected from the group consisting of a polysaccharide, a guar, hydroxypropyl guar, carboxymethylhydroxypropyl guar, a polyvinyl alcohol, a cellulose, a xanthan, hydroxyethyl cellulose, carboxymethyl cellulose, carboxyethyl cellulose, any derivative thereof, and any combination thereof.

9. The method of claim 1, wherein the multifunctional boronic acid crosslinking agent comprises a reaction product of at least one boronic acid monomer unit, at least one water-soluble monomer unit, and a solubilizing agent that is selected from the group consisting of a short chain polyol, a polysaccharide, an amino sugar, a sugar alcohol, a sugar acid, polyvinyl alcohol, tartaric acid, a catechol, a glycol, any derivative thereof, and any combination thereof.

10. The method of claim 1, wherein the multifunctional boronic acid crosslinking agent comprises a reaction product of at least one boronic acid monomer unit and at least one water-soluble monomer unit;
   wherein the at least one boronic acid monomer unit is added continuously or portionwise to a polymerization reaction mixture comprising the at least one water-soluble monomer unit.

11. The method of claim 1, wherein the treatment fluid is introduced into the subterranean formation at a pressure sufficient to create or enhance at least one fracture therein.

12. method comprising:
   providing a treatment fluid that comprises:
   an aqueous base fluid;
   a gelling agent; and
   a multifunctional boronic acid crosslinking agent comprising a copolymer that comprises at least one boronic acid monomer unit and at least one water-soluble monomer unit;
   wherein the at least one water-soluble monomer unit comprises a monomer selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof; and
   wherein the multifunctional boronic acid crosslinking agent does not comprise a gradient copolymer; and
   introducing the treatment fluid into a subterranean formation at a pressure sufficient to create or enhance at least one fracture therein.

13. The method of claim 12, wherein the at least one boronic acid monomer unit comprises an arylboronic acid.

14. The method of claim 12, wherein the multifunctional boronic acid crosslinking agent comprises a reaction product of at least one boronic acid monomer unit, at least one water-soluble monomer unit, and a solubilizing agent that is selected from the group consisting of a short chain polyol, a polysaccharide, an amino sugar, a sugar alcohol, a sugar acid, a polyvinyl alcohol, tartaric acid, a catechol, a glycol, any derivative thereof, and any combination thereof.

15. The method of claim 12, wherein the multifunctional boronic acid crosslinking agent comprises a reaction product of at least one boronic acid monomer unit and at least one water-soluble monomer unit;

wherein the at least one boronic acid monomer unit is added continuously or portionwise to a polymerization reaction mixture comprising the at least one water-soluble monomer unit.

16. The method of claim 12, wherein the gelling agent comprises a polymer selected from the group consisting of a polysaccharide, a guar, hydroxypropyl guar, carboxymethylhydroxypropyl guar, a polyvinyl alcohol, a cellulose, a xanthan, hydroxyethyl cellulose, carboxymethyl cellulose, carboxyethyl cellulose, any derivative thereof, and any combination thereof.

17. The method of claim 12, wherein the treatment fluid further comprises proppant particulates.

18. A treatment fluid comprising:
an aqueous base fluid;
a gelling agent; and
a multifunctional boronic acid crosslinking agent comprising a copolymer that comprises at least one boronic acid monomer unit and at least one water-soluble monomer unit;
wherein the at least one water-soluble monomer unit comprises a monomer selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof.

19. The treatment fluid of claim 18, wherein the multifunctional boronic acid crosslinking agent comprises a reaction product of at least one boronic acid monomer unit, at least one water-soluble monomer unit, and a solubilizing agent that is selected from the group consisting of a short chain polyol, a polysaccharide, an amino sugar, a sugar alcohol, a sugar acid, a polyvinyl alcohol, tartaric acid, a catechol, a glycol, any derivative thereof, and any combination thereof.

20. The treatment fluid of claim 18, wherein the multifunctional boronic acid crosslinking agent comprises a reaction product of at least one boronic acid monomer unit and at least one water-soluble monomer unit;
wherein the at least one boronic acid monomer unit is added continuously or portionwise to a polymerization reaction mixture comprising the at least one water-soluble monomer unit.

21. The treatment fluid of claim 18, wherein the at least one boronic acid monomer unit comprises an arylboronic acid.

22. The treatment fluid of claim 18, wherein the gelling agent comprises a polymer selected from the group consisting of a polysaccharide, a guar, hydroxypropyl guar, carboxymethylhydroxypropyl guar, a polyvinyl alcohol, a cellulose, a xanthan, hydroxyethyl cellulose, carboxymethyl cellulose, carboxyethyl cellulose, any derivative thereof, and any combination thereof.

* * * * *